US012230191B2

(12) United States Patent
Xin et al.

(10) Patent No.: US 12,230,191 B2
(45) **Date of Patent: *Feb. 18, 2025**

(54) CONTENT DEPENDENT BRIGHTNESS MANAGEMENT SYSTEM

(71) Applicant: Apple Inc., Cupertino, CA (US)

(72) Inventors: Wanqing Xin, San Jose, CA (US); Yang Xu, Santa Clara, CA (US); Mohammad Ali Jangda, Santa Clara, CA (US); Jenny Hu, Santa Clara, CA (US); Koorosh Aflatooni, Los Altos Hills, CA (US); Giovanni Corradini, Prague (CZ); Martin Kocicka, Prague (CZ); Alexey Kornienko, Watford (GB); Asha G Karvaje, San Jose, CA (US); Aishwarya Prem Renu, Palo Alto, CA (US); Andrew D Pangborn, San Francisco, CA (US); Chaohao Wang, Sunnyvale, CA (US); Yingying Tang, Sunnyvale, CA (US); Arthur L Spence, San Jose, CA (US); Mahesh B Chappalli, San Jose, CA (US)

(73) Assignee: Apple Inc., Cupertino, CA (US)

( * ) Notice: Subject to any disclaimer, the term of this patent is extended or adjusted under 35 U.S.C. 154(b) by 21 days.

This patent is subject to a terminal disclaimer.

(21) Appl. No.: 18/076,363

(22) Filed: Dec. 6, 2022

(65) Prior Publication Data

US 2024/0078961 A1 Mar. 7, 2024

Related U.S. Application Data

(60) Provisional application No. 63/404,072, filed on Sep. 6, 2022.

(51) Int. Cl.
*G09G 3/32* (2016.01)

(52) U.S. Cl.
CPC ........... *G09G 3/32* (2013.01); *G09G 2310/08* (2013.01); *G09G 2320/0295* (2013.01);
(Continued)

(58) Field of Classification Search
CPC ................ G09G 3/32; G09G 2310/08; G09G 2320/0295; G09G 2320/046;
(Continued)

(56) References Cited

U.S. PATENT DOCUMENTS 7,375,711 B2 5/2008 Horiuchi et al.
8,279,138 B1 10/2012 Margulis
(Continued)

*Primary Examiner* — Antonio Xavier
(74) *Attorney, Agent, or Firm* — Fletcher Yoder, P.C.

(57) ABSTRACT

Systems and methods are described herein to control brightness based on image content or other inputs to a display system. A dual-control system may integrate both slow control operations and fast control operations into a cohesive brightness management system. By using both shorter-term (e.g., fast control) and longer-term (e.g., slow control) brightness adjustment operations, the electronic device may quickly respond to high luminance and high brightness situations that may cause burn-in into the display, image artifacts, or other damage. Responding quickly to these high consumption situations may prevent damage or perceivable upset to an ongoing process, among other benefits.

20 Claims, 27 Drawing Sheets

(52) U.S. Cl.
CPC ................. *G09G 2320/046* (2013.01); *G09G 2320/0613* (2013.01); *G09G 2320/0626* (2013.01); *G09G 2320/103* (2013.01); *G09G 2330/023* (2013.01); *G09G 2360/144* (2013.01); *G09G 2360/16* (2013.01)

(58) Field of Classification Search
CPC ... G09G 2320/0613; G09G 2320/0626; G09G 2320/103; G09G 2330/023; G09G 2360/144; G09G 2360/16
See application file for complete search history.

(56) References Cited

U.S. PATENT DOCUMENTS

| | | | | |
|---|---|---|---|---|
| 9,143,753 | B2 | 9/2015 | Haga et al. | |
| 10,089,960 | B2 | 10/2018 | Greenebaum et al. | |
| 10,324,519 | B2 | 6/2019 | Weissmann et al. | |
| 11,283,703 | B2 | 3/2022 | Abuan et al. | |
| 11,336,708 | B2 | 5/2022 | Ramakrishnan et al. | |
| 11,756,505 | B2 * | 9/2023 | Xu | G09G 5/10 345/204 |
| 2016/0314760 | A1 * | 10/2016 | Jangda | G09G 3/3208 |
| 2021/0020140 | A1 * | 1/2021 | Li | G09G 5/10 |
| 2021/0183334 | A1 * | 6/2021 | Holland | G09G 5/001 |
| 2021/0304703 | A1 | 9/2021 | Xu et al. | |

* cited by examiner

CONTENT DEPENDENT BRIGHTNESS MANAGEMENT SYSTEM

CROSS-REFERENCE TO RELATED APPLICATIONS

This application claims priority to U.S. Provisional Application No. 63/404,072, filed Sep. 6, 2022, entitled "Content Dependent Brightness Management System," the disclosure of which is incorporated by reference herein in its entirety for all purposes.

SUMMARY

This disclosure relates to systems and methods for controlling the brightness of an electronic display based on an interaction between short-term and longer-term control systems.

A summary of certain embodiments disclosed herein is set forth below. It should be understood that these aspects are presented to provide the reader with a brief summary of these certain embodiments and that these aspects are not intended to limit the scope of this disclosure.

This disclosure relates to systems and methods to control luminance on an electronic display to enable the electronic display to display brighter pixels and achieve a greater contrast range that is, allowing some display pixels to display significantly higher brightness in many cases while not exceeding an amount of power available to the electronic display. Electronic displays are found in numerous electronic devices, from mobile phones to computers, televisions, automobile dashboards, and many more. Individual display pixels of an electronic display may collectively produce images by permitting different amounts of light to be emitted from each display pixel. Electronic displays with self-emissive display pixels produce their own light. Self-emissive display pixels may include any suitable light-emissive elements, including light-emitting diodes (LEDs) such as organic light-emitting diodes (OLEDs) or micro-light-emitting diodes (μLEDs). The amount of light emitted by each self-emissive display pixel may draw a different amount of electrical energy from the power supply. Display pixels that are programmed to emit more light will draw more power than display pixels programmed to emit less light. The total amount of light that can be emitted by the pixels of the electronic display at any one time may be limited by the total amount of power that can be supplied to the electronic display.

Increasingly, image frames of image data that may be displayed on an electronic display may have a higher dynamic range. The higher the dynamic range of the image frame, the greater the difference in contrast between the darkest image pixels and the brightest image pixels. To be able to display such content, an electronic display may be enabled to display pixels with relatively higher brightness. However, emitting more light causes the display pixel to draw more power. If too many display pixels drew too much power at one time, this could cause the power supply to be exceeded, which could result in a device malfunction. Thus, the image data that is displayed on the electronic display may be adjusted to prevent the electronic display from ever drawing too much power at any one time.

Some methods may be used to perform relatively long-term brightness adjustments (e.g., adjustments implemented over one or more image frames) or to perform relatively short-term adjustments (e.g., adjustments implemented no longer than one image frame). For example, there are relatively short-term, intra-frame corrections, like real-time pixel luminance corrections (RTPLC), that may adjust a global display brightness value via one image frame or less and there are also longer term, multiple frame corrections to global display brightness that span multiple image frames.

Sometimes these systems are in conflict. If the wrong global display brightness value is chosen, the electronic display could draw too much power or could switch between global display brightness values too rapidly, causing undesirable image artifacts or behavior. Thus, it may be desired to integrate both the longer-term adjustments with the shorter-term adjustments in a dual-control system to improve how the global display brightness value is selected.

Indeed, described herein is a content dependent brightness management system, or dual-control system, that integrates both slow control systems and methods (e.g., multi-frame adjustments) and fast control systems and methods (e.g., at most one frame adjustment) into a control operation. Using both control methods may reduce a likelihood that the two control methods fight against each other in an example implementation and may avoid a content modulated flicker for the fast control operations.

Based at least in part on these dual-control operations, the luminance scaling logic may adjust the image data for the new frame just before it is programmed into the electronic display to implement either a relatively slow adjustment or a relatively fast adjustment, thereby further improving electronic device operation without increasing a likelihood for image artifacts being presented on the display.

BRIEF DESCRIPTION OF THE DRAWINGS

Various aspects of this disclosure may be better understood upon reading the following detailed description and upon reference to the drawings described below.

DETAILED DESCRIPTION

Figure 1:
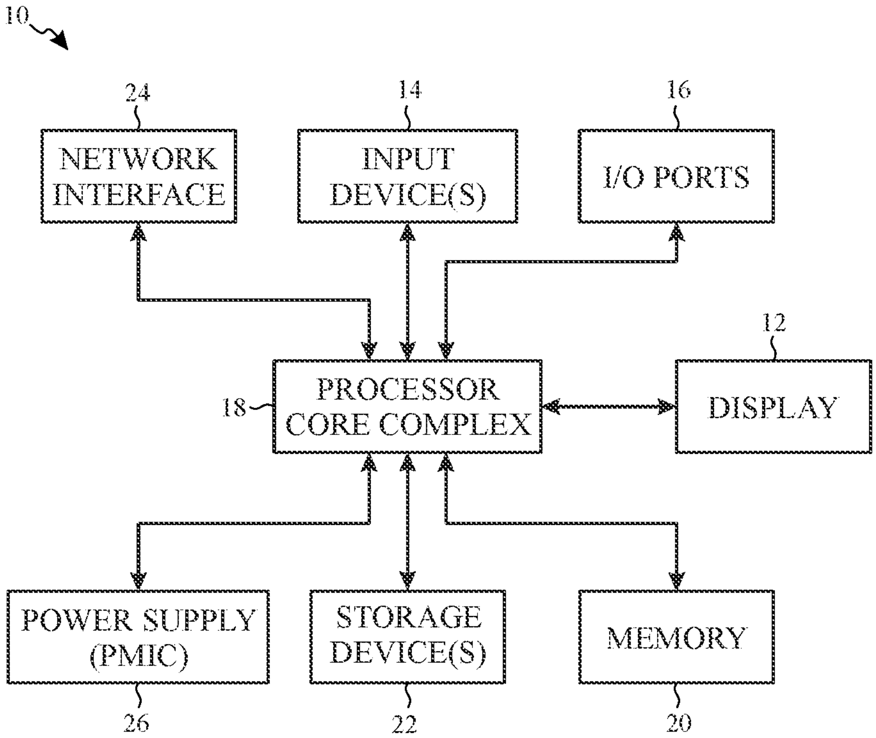
FIG. 1 is a schematic block diagram of an electronic device, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Systems and methods described herein include a dual-control system. The dual-control system may integrate both slow control operations and fast control operations into a cohesive brightness management system. By using both shorter-term (e.g., fast control) and longer-term (e.g., slow control) brightness adjustment operations, the electronic device may quickly respond to high luminance and high brightness situations that may cause burn-in into the display, image artifacts, or other damage. Responding quickly to these high consumption situations may prevent damage or perceivable upset to an ongoing process. Once the situation is initially mitigated using fast control operations, the slow control operations may take over control of the brightness level and provide a relatively smooth transition between brighter and darker screen adjustments based on inputs to a slow control system. Using slow control operations to change the brightness level over the course of multiple image frames may reduce a likelihood of a viewer perceiving image artifacts associated with the change in brightness level. By using both slow and fast control, an electronic device may take advantage of the benefits of both systems in a seamless manner, without competition between the control operations, and with a reduced likelihood of image artifacts.

With this in mind, an example of an electronic device 10, which includes an electronic display 12 that may benefit from these features, is shown in FIG. 1. The electronic device 10 may be any suitable electronic device, such as a computer, a mobile (e.g., portable) phone, a portable media device, a tablet device, a television, a handheld game platform, a personal data organizer, a virtual-reality headset, a mixed-reality headset, a vehicle dashboard, and/or the like. Thus, it should be noted that FIG. 1 is merely one example of a particular implementation and is intended to illustrate the types of components that may be present in an electronic device 10.

In addition to the electronic display 12, as depicted, the electronic device 10 includes one or more input devices 14, one or more input/output (I/O) ports 16, a processor core complex 18 having one or more processors or processor cores and/or image processing circuitry, memory 20, one or more storage devices 22, a network interface 24, and a power supply 26. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the memory 20 and the storage devices 22 may be included in a single component. Additionally or alternatively, image processing circuitry of the processor core complex 18 may be disposed as a separate module or may be disposed within the electronic display 12.

The processor core complex 18 is operably coupled with the memory 20 and the storage device 22. As such, the processor core complex 18 may execute instruction stored in memory 20 and/or a storage device 22 to perform operations, such as generating or processing image data. The processor core complex 18 may include one or more microprocessors, one or more application specific processors (ASICs), one or more field programmable logic arrays (FPGAs), or any combination thereof.

In addition to instructions, the memory 20 and/or the storage device 22 may store data, such as image data. Thus, the memory 20 and/or the storage device 22 may include one or more tangible, non-transitory, computer-readable media that store instructions executable by processing circuitry, such as the processor core complex 18, and/or data to be processed by the processing circuitry. For example, the memory 20 may include random access memory (RAM) and the storage device 22 may include read only memory (ROM), rewritable non-volatile memory, such as flash memory, hard drives, optical discs, and/or the like.

The network interface 24 may enable the electronic device 10 to communicate with a communication network and/or another electronic device 10. For example, the network interface 24 may connect the electronic device 10 to a personal area network (PAN), such as a Bluetooth network, a local area network (LAN), such as an 802.11x Wi-Fi network, and/or a wide area network (WAN), such as a $4^{th}$ Generation (4G), Long Term Evolution (LTE), or $5^{th}$ Generation (5G) cellular network. In other words, the network interface 24 may enable the electronic device 10 to transmit data (e.g., image data) to a communication network and/or receive data from the communication network.

The power supply 26 may provide electrical power to operate the processor core complex 18 and/or other components in the electronic device 10, for example, via one or more power supply rails. Thus, the power supply 26 may include any suitable source of electrical power, such as a rechargeable lithium polymer (Li-poly) battery and/or an alternating current (AC) power converter. A power management integrated circuit (PMIC) may control the provision and generation of electrical power to the various components of the electronic device 10.

The I/O ports 16 may enable the electronic device 10 to interface with another electronic device 10. For example, a portable storage device may be connected to an I/O port 16, thereby enabling the electronic device 10 to communicate data, such as image data, with the portable storage device.

The input devices 14 may enable a user to interact with the electronic device 10. For example, the input devices 14 may include one or more buttons, one or more keyboards, one or more mice, one or more trackpads, and/or the like. Additionally, the input devices 14 may include touch sensing components implemented in the electronic display 12. The touch sensing components may receive user inputs by detecting occurrence and/or position of an object contacting the display surface of the electronic display 12.

In addition to enabling user inputs, the electronic display 12 may facilitate providing visual representations of information by displaying one or more images (e.g., image frames or pictures). For example, the electronic display 12 may display a graphical user interface (GUI) of an operating system, an application interface, text, a still image, or video content. To facilitate displaying images, the electronic display 12 may include a display panel with one or more display pixels. The display pixels may represent sub-pixels that each control a luminance of one color component (e.g., red, green, or blue for an RGB pixel arrangement).

The electronic display 12 may display an image by controlling the luminance of its display pixels based at least in part image data associated with corresponding image pixels in image data. In some embodiments, the image data may be generated by an image source, such as the processor core complex 18, a graphics processing unit (GPU), an image sensor, and/or memory 20 or storage devices 22.

Additionally, in some embodiments, image data may be received from another electronic device 10, for example, via the network interface 24 and/or an I/O port 16.

Figure 2:
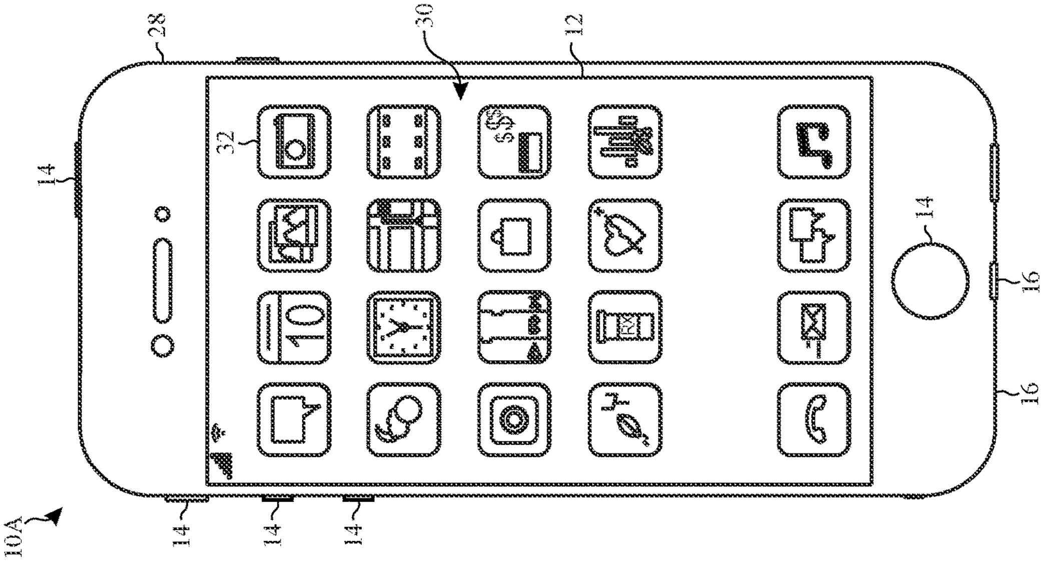
FIG. 2 is a front view of a mobile phone representing an example of the electronic device of FIG. 1, in accordance with an embodiment.

One example of the electronic device 10, specifically a handheld device 10A, is shown in FIG. 2. The handheld device 10A may be a portable phone, a media player, a personal data organizer, a handheld game platform, and/or the like. For example, the handheld device 10A may be a smart phone, such as any iPhone® model available from Apple Inc.

The handheld device 10A includes an enclosure 28 (e.g., housing). The enclosure 28 may protect interior components from physical damage and/or shield them from electromagnetic interference. In the depicted embodiment, the electronic display 12 is displaying a graphical user interface (GUI) 30 having an array of icons 32. By way of example, when an icon 32 is selected either by an input device 14 or a touch sensing component of the electronic display 12, an application program may launch.

Input devices 14 may be provided through the enclosure 28. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. The I/O ports 16 also open through the enclosure 28. The I/O ports 16 may include, for example, a Lightning® or Universal Serial Bus (USB) port.

Figure 3:
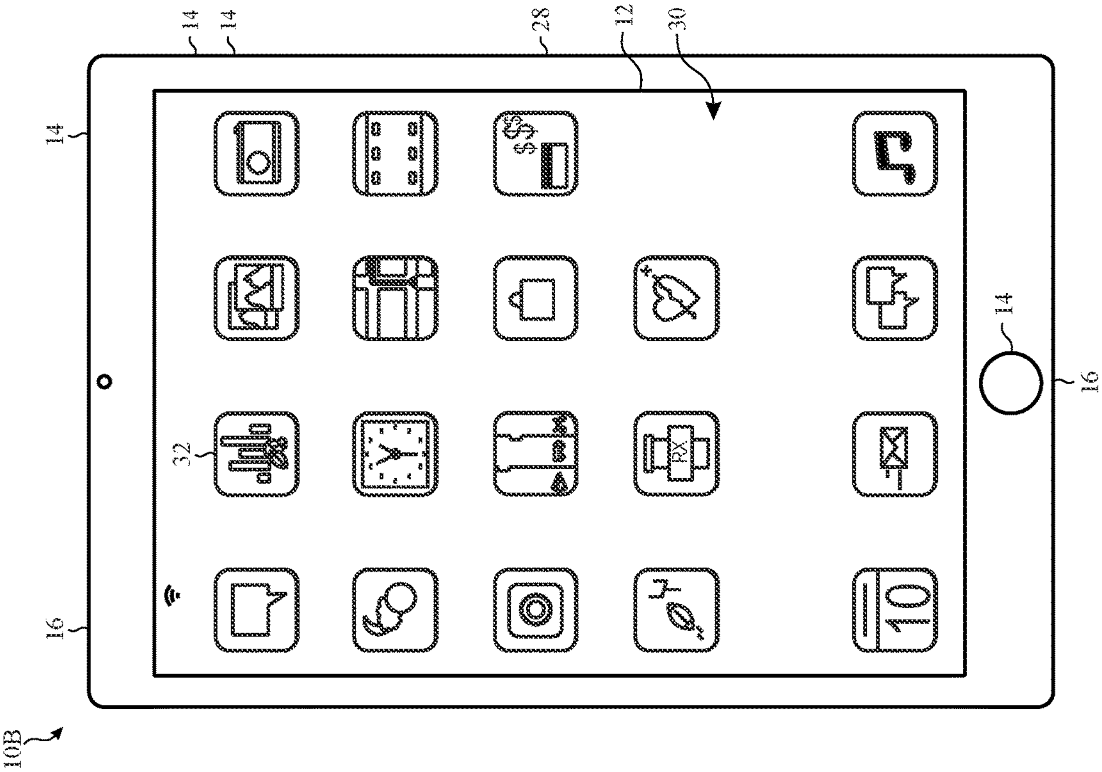
FIG. 3 is a front view of a tablet device representing an example of the electronic device of FIG. 1, in accordance with an embodiment.
Figure 4:
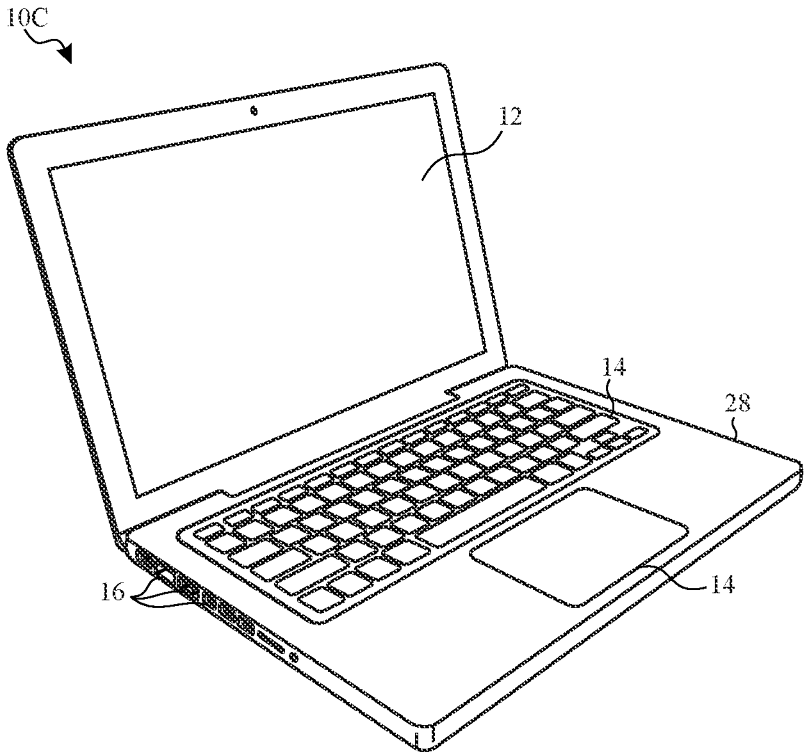
FIG. 4 is a front view of a notebook computer representing an example of the electronic device of FIG. 1, in accordance with an embodiment.
Figure 5:
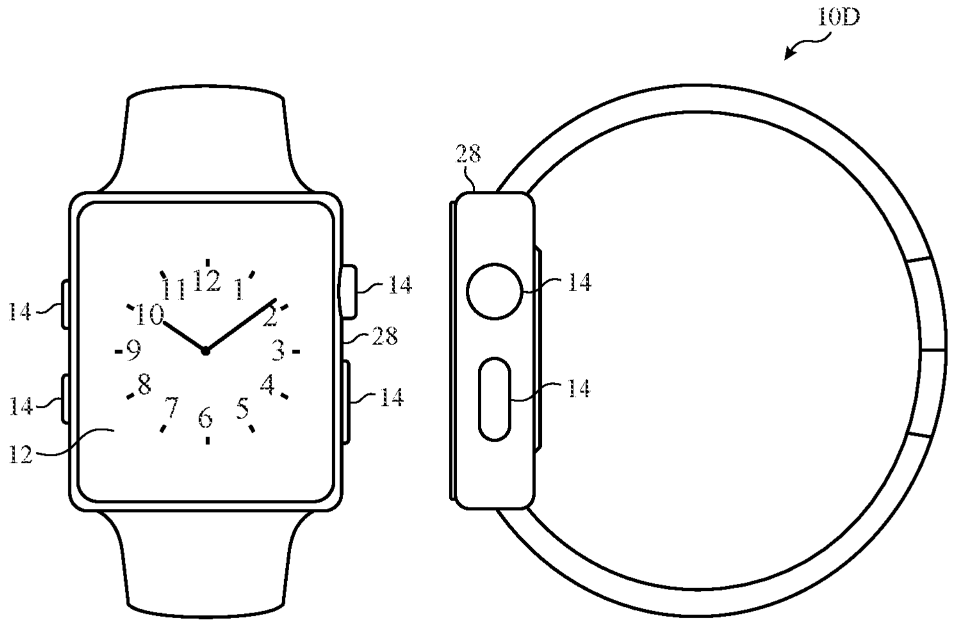
FIG. 5 are front and side views of a watch representing an example of the electronic device of FIG. 1, in accordance with an embodiment.

The electronic device 10 may take the form of a tablet device 10B, as shown in FIG. 3. By way of example, the tablet device 10B may be any iPad® model available from Apple Inc. A further example of a suitable electronic device 10, specifically a computer 10C, is shown in FIG. 4. By way of example, the computer 10C may be any MacBook® or iMac® model available from Apple Inc. Another example of a suitable electronic device 10, specifically a watch 10D, is shown in FIG. 5. By way of example, the watch 10D may be any Apple Watch® model available from Apple Inc. As depicted, the tablet device 10B, the computer 10C, and the watch 10D all include respective electronic displays 12, input devices 14, I/O ports 16, and enclosures 28.

Figure 6:
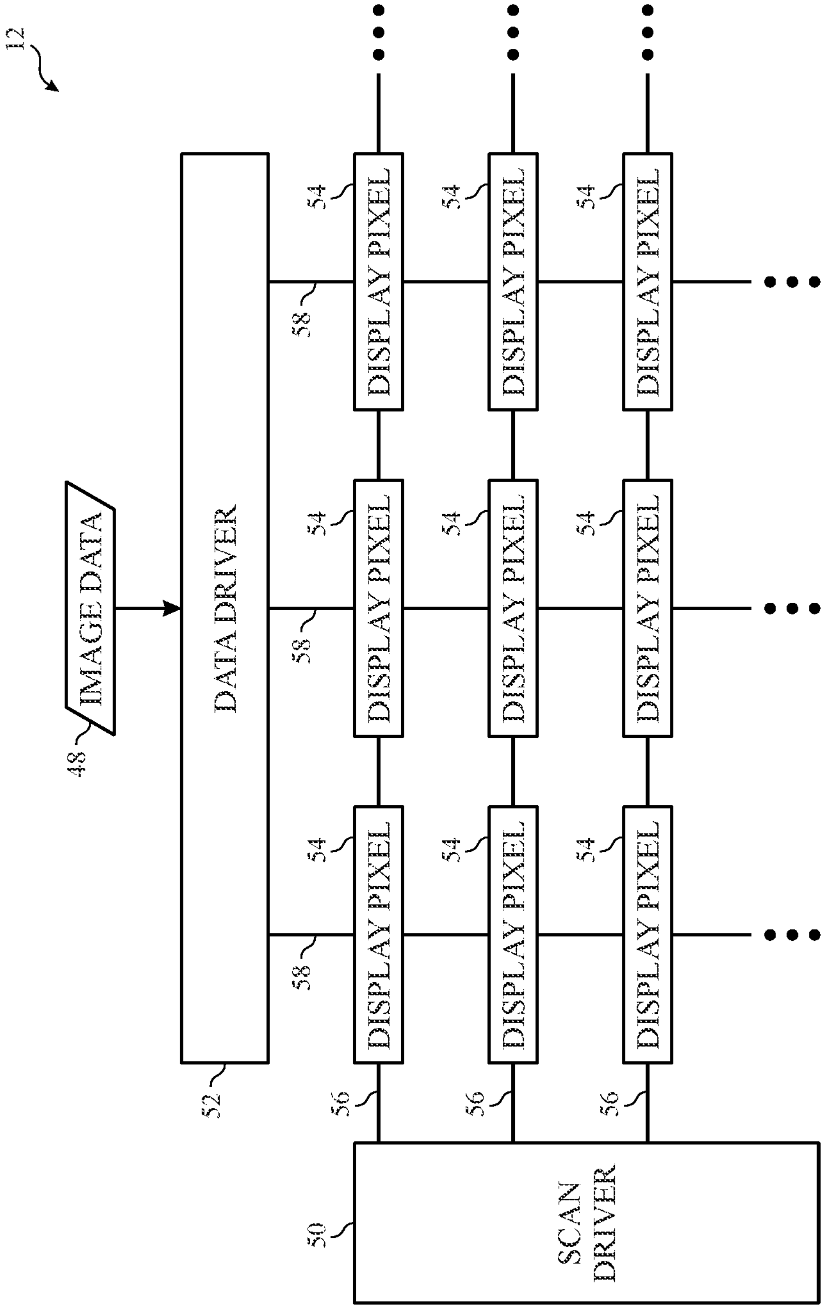
FIG. 6 is a block diagram of an electronic display of the electronic device, in accordance with an embodiment.

As shown in FIG. 6, the electronic display 12 may receive image data 48 for display on the electronic display 12. The electronic display 12 includes display driver circuitry that includes scan driver 50 circuitry and data driver 52 circuitry that can program the image data 48 onto display pixels 54. The display pixels 54 may each contain one or more self-emissive elements, such as a light-emitting diodes (LEDs) (e.g., organic light emitting diodes (OLEDs) or micro-LEDs (μ-LEDs)). Different display pixels 54 may emit different colors. For example, some of the display pixels 54 may emit red light, some may emit green light, and some may emit blue light. Thus, the display pixels 54 may be driven to emit light at different brightness levels to cause a user viewing the electronic display 12 to perceive an image formed from different colors of light. The display pixels 54 may also correspond to hue and/or luminance levels of a color to be emitted and/or to alternative color combinations, such as combinations that use cyan (C), magenta (M), or the like. Moreover, each display pixel 54 may draw a different amount of power from the power supply 26 depending on the amount of light emitted by that display pixel 54. The more light emitted, the more power consumed.

The scan driver 50 may provide scan signals (e.g., pixel reset, data enable) on scan lines 56 to control the display pixels 54 by row. For example, the scan driver 50 may cause a row of the display pixels 54 to become enabled to receive a portion of the image data 48 from data lines 58 from the data driver 52. In this way, an image frame of image data 48 may be programmed onto the display pixels 54 row by row. Other examples of the electronic display 12 may program the display pixels 54 in groups other than by row. In general, however, the image data 48 for a particular image frame is received by, and programmed into, the electronic display 12 in pieces. For example, the image data 48 maybe received as a stream of pixels that can be programmed into the display pixels 54 on a row-by-row basis.

Since the entire frame of image data 48 may not be known in advance, the total power that will be drawn by the electronic display when the entire frame of image data 48 is programmed onto the electronic display 12 may not be known in advance. As such, intra-frame luminance scaling may be applied to the image data 48 based at least in part on an accumulated total luminance being emitted by the electronic display 12.

Keeping the foregoing in mind, one type of luminance control may use adjustments implemented at a frame-by-frame level (e.g., fast luminance control). In other words, changes to luminance may occur between sequentially presented image frames. This contrasts with systems that implement luminance adjustments more slowly over multiple sequential image frames (e.g., slow luminance control), as will be appreciated later.

Fast Luminance Control System

Figure 7:
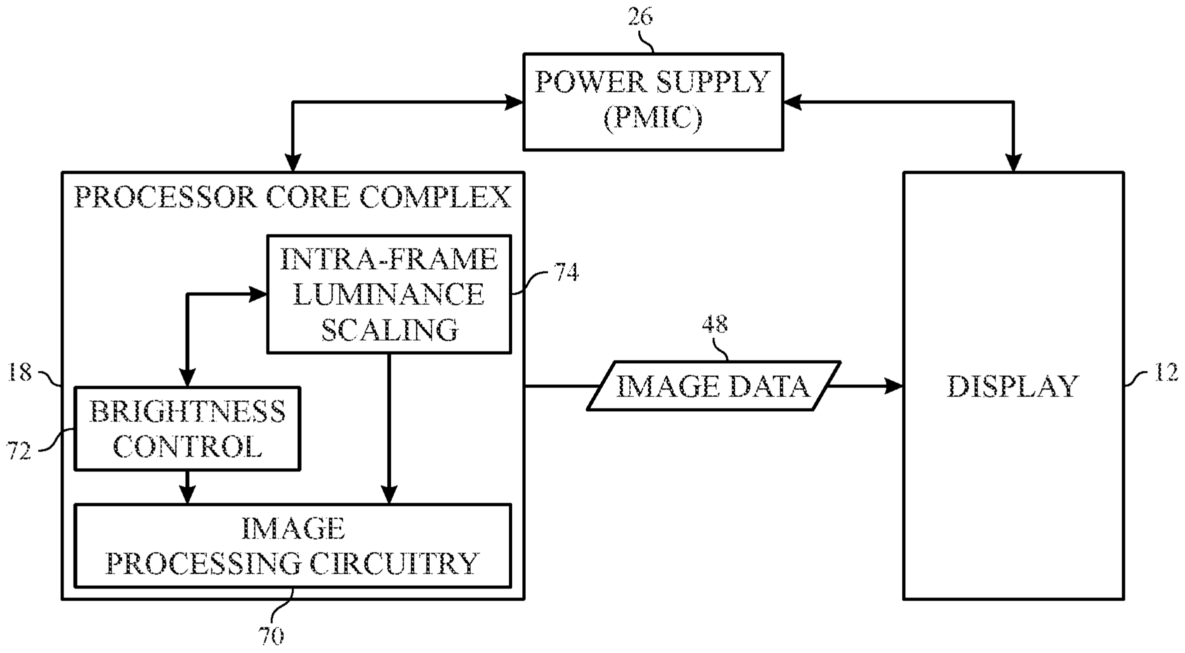
FIG. 7 is a block diagram of a system for displaying image data on the electronic display at high brightness and without exceeding a power supply using intra-frame luminance scaling logic in processing circuitry, in accordance with an embodiment.
Figure 8:
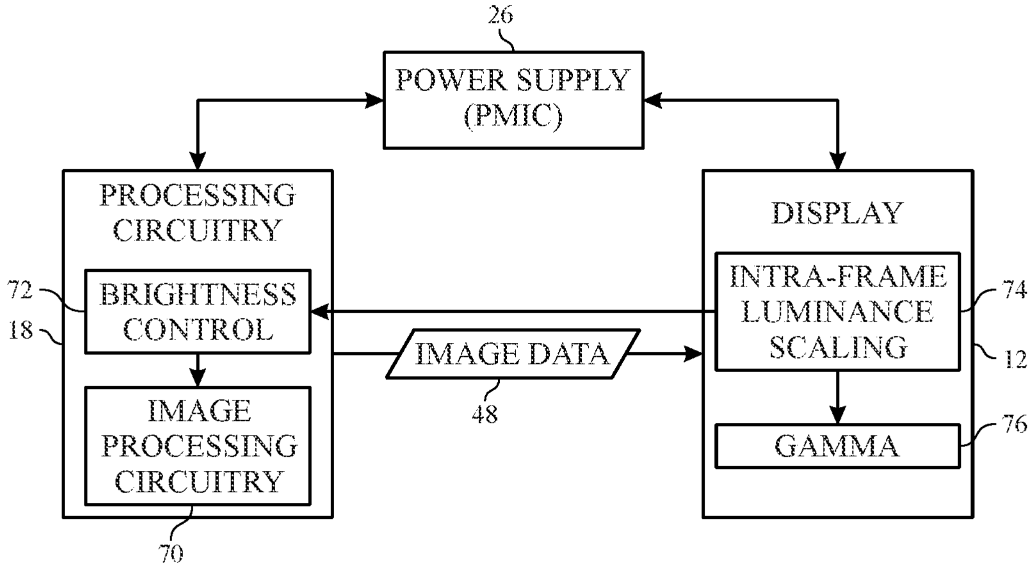
FIG. 8 is a block diagram of a system for displaying image data on the electronic display at high brightness and without exceeding a power supply using intra-frame luminance scaling logic disposed on the electronic display, in accordance with an embodiment.

Turning now to fast luminance control operations, block diagrams of examples of such a system are shown in FIGS. 7 and 8. As illustrated, the power supply 26 supplies power both to the processor core complex 18 and the electronic display 12. The processor core complex 18 may generate and send the image data 48 to the electronic display 12. Image processing circuitry 70, which may include a display pipeline or memory-to-memory scaling and rotating (MSR) circuitry, may be used to prepare the image data 48 for display on the electronic display 12.

Brightness control 72 may determine a global display brightness value (DBV) for the electronic display 12. The brightness control 72 may take any suitable form, such as instructions running on the processor core complex 18 or as circuitry (e.g., one or more processing blocks of an application-specific integrated circuit (ASIC)), or both. In one particular example, the brightness control 72 may be a component of an operating system of the electronic device 10. For instance, a user may be able to increase or decrease a global brightness of the electronic display 12 via a graphical user interface (GUI) of the electronic device 10. The image processing circuitry 70 may take into account the global display brightness value when processing the image data 48. Additionally or alternatively, the global display brightness value may be provided along with the image data 48 to the electronic display 12. For instance, the electronic display 12 may adjust the conversion of the image data 48 into programming signals that program the individual display pixels based at least in part on the global display brightness value.

The image processing circuitry 70 may process a frame of the image data 48 on a pixel-by-pixel basis, and the electronic display 12 may program the frame of the image data 48 on a row-by-row basis. To prevent the image data 48 from causing the electronic display 12 to exceed a maximum available power from the power supply 26, intra-frame luminance scaling 74 may scale the luminance of the image data 48 mid-frame (e.g., in real time). The intra-frame luminance scaling 74 may likewise take any suitable form, such as instructions running on the processor core complex 18 or as circuitry (e.g., one or more processing blocks of an application-specific integrated circuit (ASIC)), or both. In the example of FIG. 7, the intra-frame luminance scaling 74 is shown as part of the processor core complex 18, but in FIG. 8, it is shown as a component of the electronic display 12. In some other examples, the intra-frame luminance scaling 74 may be disposed partly in the processor core complex 18 and partly on the electronic display 12. Additionally or alternatively, the intra-frame luminance scaling 74 may represent an image processing block in a display pipeline of the image processing circuitry 70. Since the ultimate luminance that will be displayed on the electronic display 12 affects the amount of power drawn by the electronic display 12, in these embodiments, the intra-frame luminance scaling 74 may be among the later processing blocks of the display pipeline (e.g., the last processing block before transmission to the electronic display 12).

The intra-frame luminance scaling 74 may track a total luminance being displayed by the electronic display 12, which may be referred to as an instantaneous average pixel luminance of the electronic display 12. Since the electronic display 12 is programmed row by row, some of the light emitted by the electronic display 12 will be due to display pixels that have been programmed with the current frame of image data 48, while the rest of the light emitted by the electronic display 12 will be due to display pixels that have not yet been programmed with the current frame of image data 48 and are still emitting light based on the previous frame of image data 48. Thus, the total luminance tracked by the intra-frame luminance scaling 74 (e.g., the instantaneous average pixel luminance) may include a running accumulation of an average pixel luminance for the electronic display 12 over one full image frame (including some pixels programmed with the current image frame and some pixels programmed with the previous frame). To ensure that the total luminance does not cause the electronic display 12 to draw too much power from the power supply 26, the intra-frame luminance scaling 74 may cause the luminance of the image data 48 to be scaled based on how close the running total of the luminance over one frame approaches the maximum allowable luminance. This will be described in more detail below.

When the intra-frame luminance scaling 74 determines to scale the luminance of the image data 48, it may do so by causing the image processing circuitry 70 to perform the scaling of certain rows of the image data as the pixels of the rows are being processed (e.g., as represented by FIG. 7) or directly (e.g., as represented by FIG. 8). Luminance scaling may take place while the image data 48 is in any suitable representation. For example, the luminance scaling may take place while the image data is in a linear domain, a gamma (e.g., gray scale) domain, and may take place as a digital or an analog operation. In the example of FIG. 8, luminance scaling may involve applying a scaling factor to gamma circuitry 76 that transforms the image data 48 into programming signals that are used to program the display pixels of the electronic display 12. Since the image processing circuitry 70 may be processing the image data 48 on a pixel-by-pixel basis, the expected luminance of the entire current frame may not be known in advance. As such, the luminance scaling of the image data 48 may take place within the current image frame to avoid drawing too much power from the power supply 26. Thus, the electronic display 12 may operate at a higher brightness most of the time without exceeding the power supply. This may allow the electronic display 12 to display higher dynamic range content.

Depending on the total luminance of the current frame or the amount of luminance scaling that is performed, the intra-frame luminance scaling 74 may indicate to the brightness control 72 that the global display brightness value should be reduced for a subsequent image frame. In the example of FIG. 8, where the intra-frame luminance scaling 74 is disposed in the display driver circuitry of the electronic display 12, a sideband channel may be used to communicate a request to reduce the global display brightness value for a subsequent image frame (e.g., a register of the electronic display 12 that is accessible by the processor core complex 18 or an interrupt).

Figure 9:
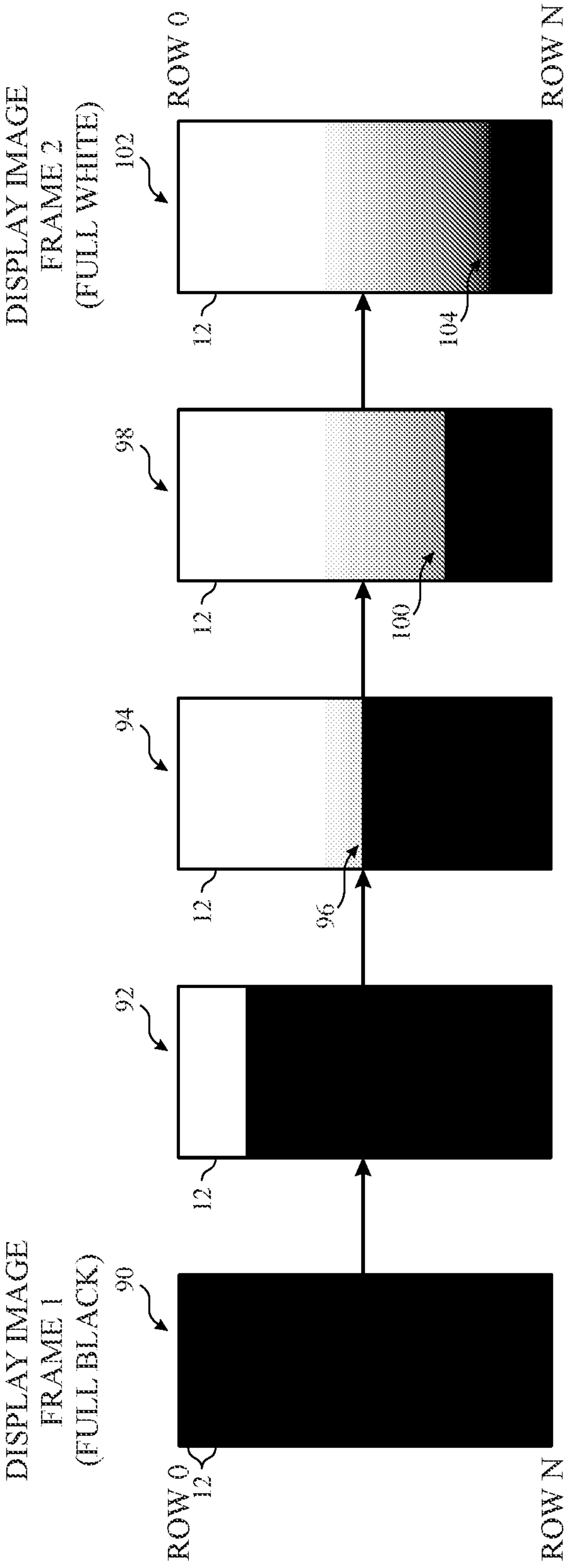
FIG. 9 illustrates an example of intra-frame luminance scaling in a worst-case scenario of transitioning from a fully black frame to a fully white frame, in accordance with an embodiment.

FIG. 9 illustrates intra-frame luminance scaling that may occur when the image frame changes from a fully black image frame 1 (i.e., no light is emitted) to a fully white image frame 2 at a maximum global display brightness value (i.e., all display pixels would be emitting maximum light if so programmed, potentially drawing excessive power from the power supply at some global display brightness values). Since the content of the new image frame is not known in advance, the intra-frame luminance scaling of the electronic device 10 may begin to scale the image data as the total instantaneous luminance increases past some threshold value.

The example of FIG. 9 takes place during one refresh of the electronic display 12 in which image data for a current frame (image frame 2) is programmed over the image data for a previous frame (image frame 1). At a time 90, all of the pixels of the electronic display 12 from Row 0 to Row N are programmed to display black (i.e., not emitting light). The electronic display 12 is refreshed with new image data row by row, and by a time 92, several rows have been programmed with image data to produce white. For example, the red, green, and blue display pixels of those rows may be programmed at full brightness, resulting in the appearance of white on those rows of the electronic display 12. As more rows of the display pixels are programmed to high brightness values, however, it becomes more likely that the electronic display 12 may approach the instantaneous limit of power that can be supplied by the power supply. As such, at a time 94, the luminance of the image data programmed into a row 96 of the display pixels may be scaled to reduce light emission. At a time 98, this may continue as the luminance of subsequent rows 100 are scaled further. Finally, at a time 102, the last of the image data may be programmed into the electronic display 12. To avoid drawing too much power, the luminance of some rows 104 of the display pixels may be completely scaled to 0 (i.e., not emitting any light). While this could produce a temporary transient artifact in this worst-case scenario, the next frame may be scaled to a lower global display brightness value that may avoid such instantaneous luminance scaling, and the electronic display 12 has been prevented from drawing excessive power while still able to operate at high brightness.

Figure 10:
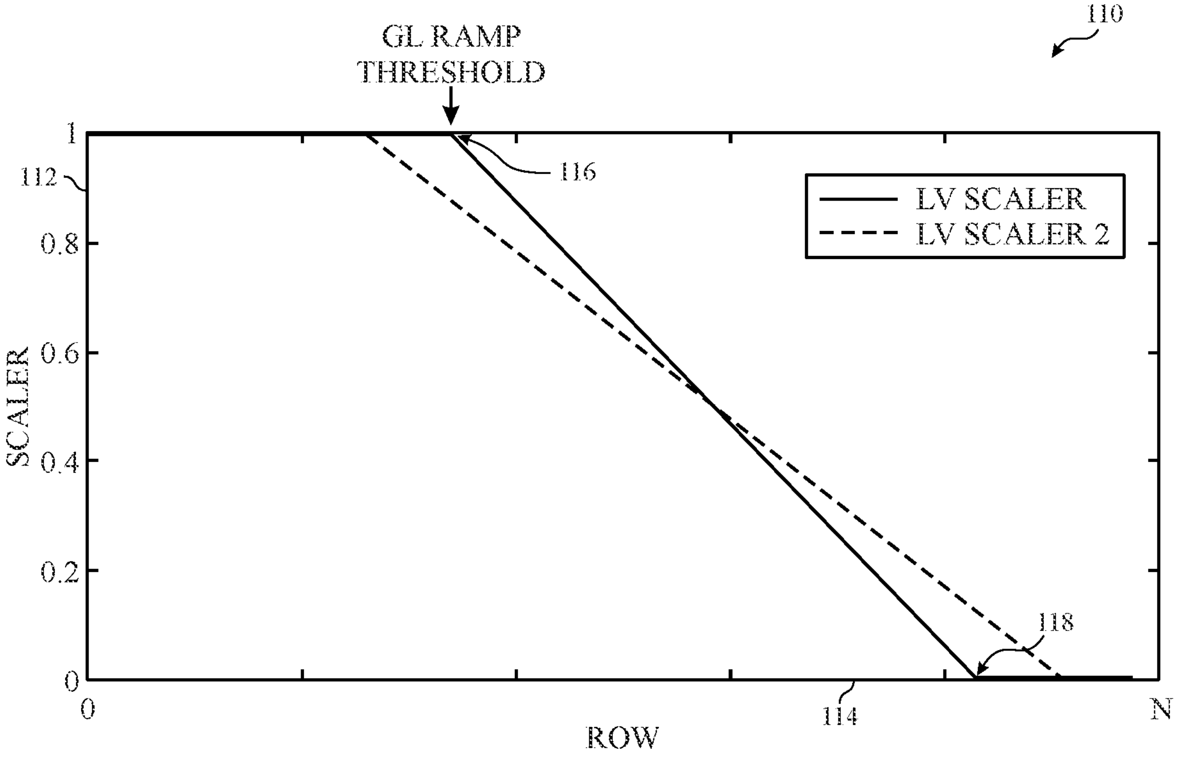
FIG. 10 is a plot showing scaling values applied to the image data in the example of FIG. 9, in accordance with an embodiment.

A plot 110 shown in FIG. 10 illustrates the luminance scaling applied in the example of FIG. 9. The plot 110 illustrates a scaling value (ordinate 112) between 0 to 1 that is applied to the image data of each row (abscissa 114) from Row 0 to Row N. Two curves represent a form of luminance scaling that may be applied. A first curve labeled Lv Scaler (solid line) represents a more abrupt scaling that starts later, while a second curve labeled Lv Scaler 2 (dashed line)

represents a smoother scaling that starts earlier. The first curve (solid line) of the plot 110 of FIG. 10 corresponds to the scaling performed in the example shown in FIG. 9. Following this first curve (solid line), for the first of many rows, the scaling value applied to the image data is 1, meaning that the image data is not changed. In other words, the fully white image frame that is being programmed onto the electronic display 12 in FIG. 9 remains fully white for the first several rows. At a gray level (GL) ramp threshold 116, corresponding to the row 96, the luminance of the image data begins to be scaled down. Because Image Frame 1 of FIG. 9 is fully black (i.e., no light transmission from any display pixels), every non-black display pixel for Image Frame 2 will add to the total average pixel luminance of the electronic display 12. Thus, as additional rows of display pixels are programmed in the electronic display 12, the image data is scaled down according to the first curve (solid line) of the plot 110 of FIG. 10. This continues until the image data for additional pixels is scaled to 0 at a maximum average pixel luminance 118, beyond which point the electronic display 12 may not emit any more light or the electronic display 12 will exceed a power threshold and draw too much power from the power supply 26. This corresponds to the row 104 and below, where the display pixels display black (i.e., do not emit light).

Figure 11:
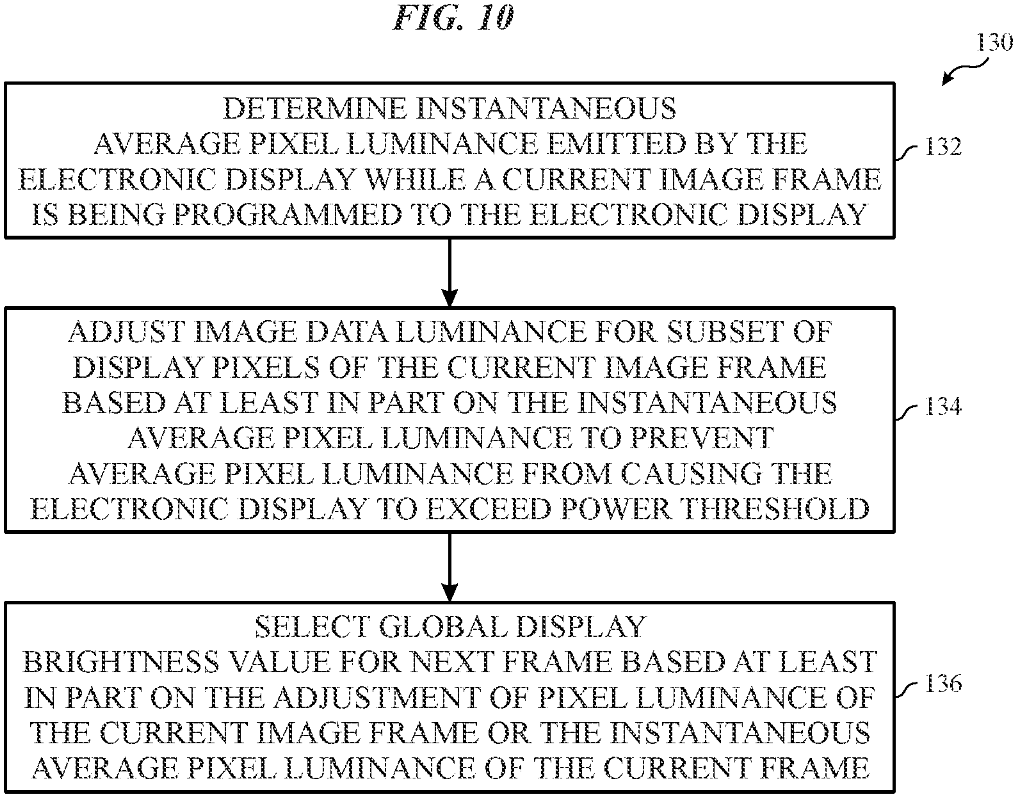
FIG. 11 is a flowchart of a method for performing intra-frame luminance scaling to enable higher display brightness while preventing excessive power from being drawn by the electronic display, in accordance with an embodiment.

One example of a method for performing luminance scaling by tracking the instantaneous luminance output by the electronic display is shown by a flowchart 130 of FIG. 11. The method of the flowchart 130 may be performed by any suitable circuitry (e.g., one or more processing blocks of an application-specific integrated circuit (ASIC)) or instructions (e.g., software or firmware) running on processing circuitry (e.g., the processor core complex). For example, the flowchart 130 may be performed by the intra-frame luminance scaling 74 implemented as instructions running on the processor core complex 18 or as circuitry (e.g., one or more processing blocks of an application-specific integrated circuit (ASIC)), or both, and/or the image processing circuitry 70.

At block 132 of the flowchart 130, an instantaneous average pixel luminance of the electronic display 12 may be determined while a current image frame is being programmed into the electronic display 12. The instantaneous average pixel luminance may be any suitable value corresponding to the amount of light currently being emitted by the electronic display 12. In one example, the instantaneous average pixel luminance represents a value between 0 and 1 that corresponds to the average brightness of the image data that has been sent to the electronic display for programming (e.g., image data that has been programmed into a first subset of the display pixels corresponding to a current frame and image data that was previously programmed into the rest of the display pixels corresponding to the previous frame). However, the total amount of light emitted by the electronic display 12 also depends on the global display brightness value (by which the image data is adjusted to achieve the total light output; the same image frame at different global display brightness values will result in different amounts of emitted light). Consider an example where the image data for all display pixels is a maximum gray level. If the global display brightness value is very low, the total amount of light emitted by the electronic display 12 may be relatively low. By contrast, if the global display brightness value is very high, the total amount of light emitted by the electronic display 12 could cause the electronic display 12 to draw more power than the power supply could provide. Therefore, the instantaneous average pixel luminance may be considered in combination with the global display brightness value with respect to intra-frame luminance scaling.

Indeed, at block 134, the luminance of a subset of the image data (e.g., for a current row or next row of display pixels) may be scaled based at least in part on the instantaneous average pixel luminance, taking into account the global display brightness value. Any suitable luminance scaling function may be used. For example, the function may depend on the instantaneous average pixel luminance and global display brightness. Certain examples will be discussed below with reference to FIGS. 15-20.

When, at block 134, the luminance of the image data is scaled to reduce the total light emission of the electronic display, this may suggest that the global display brightness value should be reduced in a subsequent frame. Thus, under those conditions, a global brightness may be selected for a subsequent frame that is lower than the current frame (block 136). In one example, a global display brightness value for a subsequent image frame (e.g., the next image frame or another future image frame) may be selected to result in no luminance scaling for the next frame if the image data remained the same. In another example, the global display brightness value for a subsequent image frame may be selected to result in less than some threshold amount of luminance scaling if the next frame if the image data remained the same.

Figure 12:
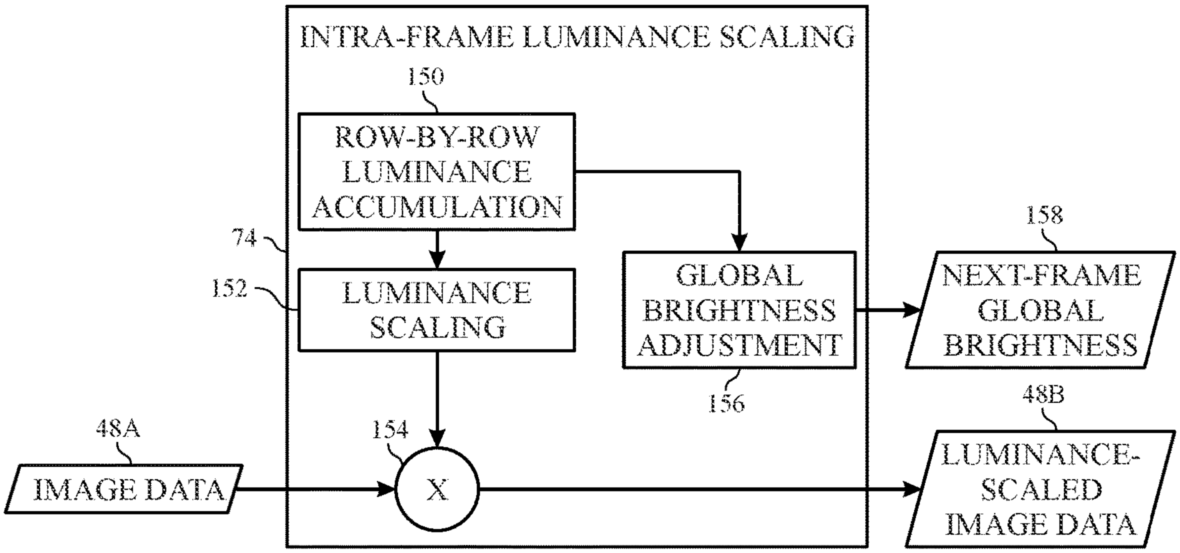
FIG. 12 is a block diagram of intra-frame luminance scaling logic that may be implemented in circuitry or as instructions executed on a processor, in accordance with an embodiment.

One example of a block diagram of the intra-frame luminance scaling 74 is shown in FIG. 12. As mentioned above, the intra-frame luminance scaling 74 may be implemented as instructions running on a processor (e.g., software or firmware running on the processor core complex 18 or other processing circuitry of the electronic device 10) or implemented as circuitry (e.g., one or more processing blocks of an application-specific integrated circuit (ASIC)), or both. In some cases, the intra-frame luminance scaling 74 may be disposed partly in the processor core complex 18 and partly on the electronic display 12. Additionally or alternatively, the intra-frame luminance scaling 74 may represent an image processing block in a display pipeline of the image processing circuitry 70.

The intra-frame luminance scaling 74 may include a row-by-row luminance accumulation 150 (e.g., row-by-row luminance accumulation circuitry) that tracks a current instantaneous average pixel luminance of the electronic display 12. The row-by-row luminance accumulation 150 may maintain a total accumulation of average pixel luminance for the electronic display 12 over one total frame. Thus, the total accumulation of average pixel luminance over one total frame may represent an instantaneous average pixel luminance that may include: (1) the average pixel luminance for those display pixels that have been programmed with image data for a current frame of image data and (2) the average pixel luminance for those display pixels that have not yet been programmed with the image data for the current frame of image data, and thus are still programmed with image data for a previous image frame. The row-by-row luminance accumulation 150 may accumulate the total average pixel luminance over one frame by accumulating an instantaneous average pixel luminance for each row of display pixels (e.g., divided by the total number of rows of the electronic display). In one example, the row-by-row luminance accumulation 150 may use a 1-column row buffer (e.g., located in the memory 20 or as a component of the row-by-row luminance accumulation 150). The 1-column row buffer may store one instantaneous average pixel luminance for each row. By accumulating all values of the 1-column row buffer, the instantaneous average pixel luminance of the entire electronic display 12 may be obtained.

Luminance scaling 152 (e.g., luminance scaling circuitry) may determine a scaling factor to apply to image data 48A for current pixels (e.g., a current row) of the current image frame based at least in part on the instantaneous average pixel luminance of the electronic display 12. As mentioned above, the total luminance output by the electronic display 12 may depend on both the instantaneous average pixel luminance due to the image data and the current global display brightness value for the electronic display. The higher the global display brightness value, the higher the total luminance output and thus the higher the total power drawn by the electronic display 12 for the same image data. Therefore, the luminance scaling 152 may consider both the instantaneous average pixel luminance and the global display brightness value.

In one example, the luminance scaling 152 may use a two-dimensional lookup table to determine a luminance scaling value that is a function of the instantaneous average pixel luminance and the global display brightness value. The luminance scaling 152 may apply the luminance scaling value to the incoming image data 48A via a multiplier 154, producing luminance-scaled image data 48B. The luminance-scaled image data 48B may be programmed for display on the electronic display 12. As such, the luminance-scaled image data 48B may be used by the row-by-row luminance accumulation 150 to determine the instantaneous average pixel luminance of the electronic display 12. In other cases, however, the row-by-row luminance accumulation 150 may use the image data 48A or some other estimation of the image data that has been displayed on the electronic display 12 for determining the instantaneous average pixel luminance of the electronic display 12.

The luminance scaling 152 may use any suitable function of luminance scaling to determine the luminance scaling value. Certain examples of such functions are discussed below with reference to FIGS. 15-20. In one example, mentioned above, such functions may be stored as a two-dimensional lookup table indexed to the instantaneous average pixel luminance and the global display brightness value. In other examples, the functions may be programmed and calculated directly by the luminance scaling 152.

The intra-frame luminance scaling 74 may also use a global brightness adjustment 156 (e.g., row-by-row luminance accumulation circuitry) to reduce the global display brightness value for a subsequent frame of image data in some situations. For example, the global brightness adjustment 156 may select a lower global display brightness value for a subsequent frame (e.g., the next frame) of image data based at least in part on the instantaneous average pixel luminance and the current global display brightness value and/or an amount of scaling by the luminance scaling 152. For instance, the global display brightness value for the subsequent frame may be selected so that a subsequent image frame (e.g., the next image frame or another future image frame) may avoid luminance scaling for the next frame if the image data remained the same, if the image data was less bright by some threshold, or if the image data increased in brightness by some threshold. In another example, the global display brightness value for a subsequent image frame may be selected to result in some threshold amount of luminance scaling if the next frame if the image data remained the same, if the image data was less bright by some threshold, or if the image data increased in brightness by some threshold. In one example, the global brightness adjustment 156 may use a lookup table indexed to a luminance threshold corresponding to an initial luminance scaling performed by the luminance scaling 152. In another example, the global brightness adjustment 156 may use and/or include a two-dimensional lookup table indexed to the average pixel luminance and the current global display brightness value.

The global brightness adjustment 156 may output a next-frame global display brightness value 158 to be used for a subsequent image frame. When the intra-frame luminance scaling 74 is disposed in the display driver circuitry of the electronic display 12, a sideband channel may be used to communicate a request to reduce the global display brightness value for a subsequent image frame (e.g., a register of the electronic display 12 that is accessible by the processor core complex 18 or an interrupt).

Figure 13:
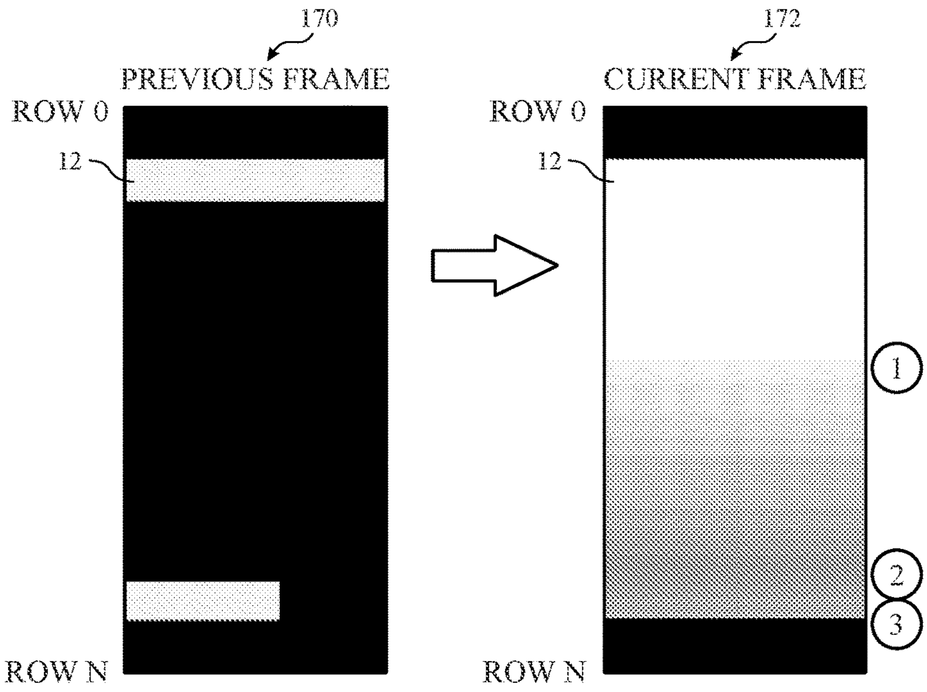
FIG. 13 illustrates another example of intra-frame luminance scaling when transitioning from displaying a previous image frame to displaying a current image frame on the electronic display, in accordance with an embodiment.
Figure 14:
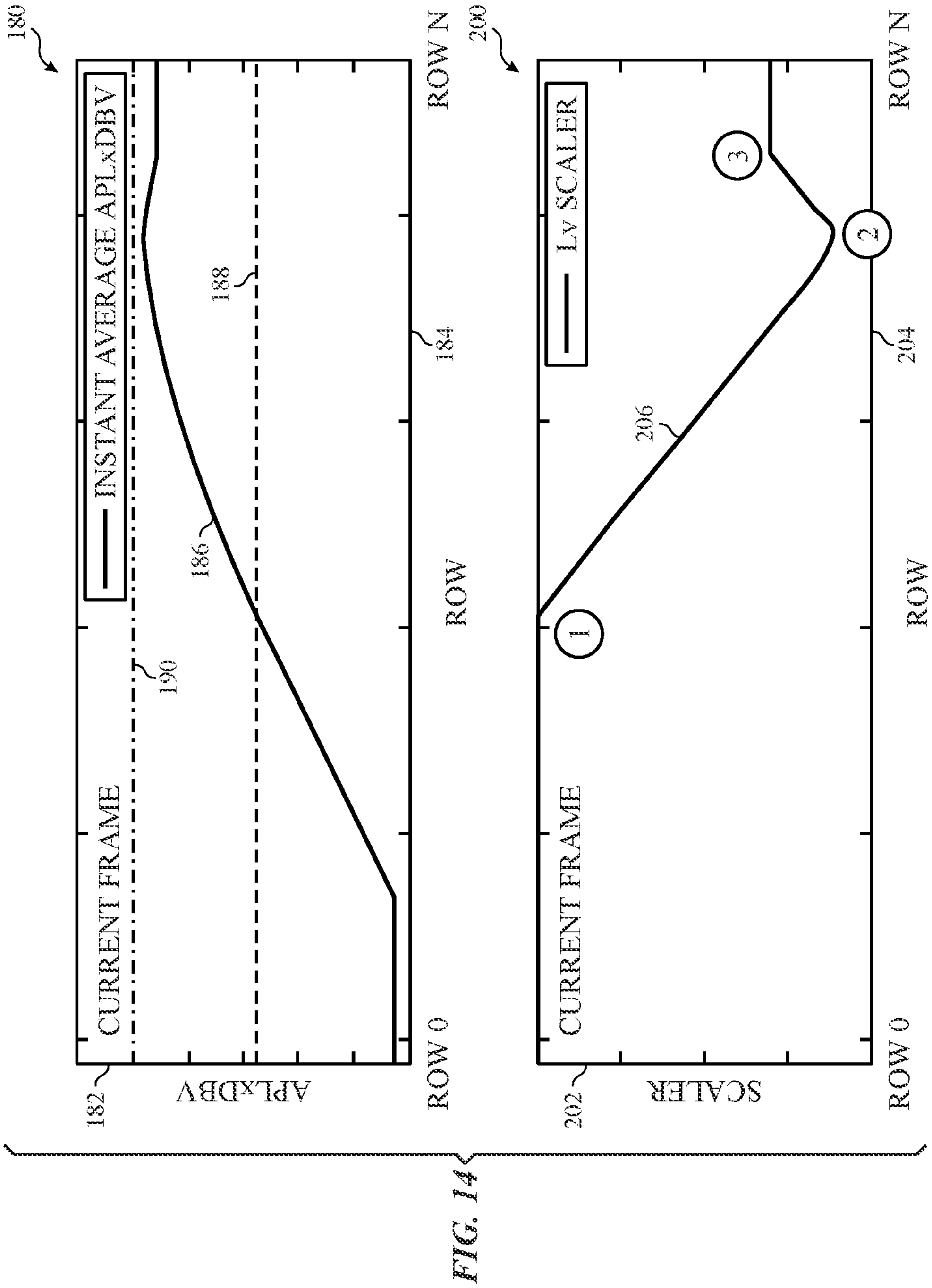
FIG. 14 represents two plots showing instantaneous luminance output by the electronic display and luminance scaling for the example of FIG. 13, in accordance with an embodiment.

FIGS. 13 and 14 illustrate the use of the intra-frame luminance scaling 74 in an example where the electronic display 12 changes from displaying a previous frame 170 to a current frame 172. A plot 180 of FIG. 14 represents a total luminance emitted by the electronic display 12 (ordinate 182) for the rows of display pixels (abscissa 184) programmed for the current frame 172. A curve 186 illustrates the total luminance (e.g., the instantaneous average pixel luminance (APL) as multiplied by the global display brightness value (DBV)). A scaling threshold 188 marks a total luminance above which point luminance scaling is used in an effort to avoid reaching a maximum total luminance 190, above which the electronic display 12 would draw too much power from the power supply 26. A plot 200 of FIG. 14 plots the scaling value (ordinate 202) for the rows of display pixels (abscissa 204) to be programmed for the current frame 172. A curve 206 represents a scaling value applied to the image data across the current frame 172.

As can be seen in FIG. 13, the previous frame 170 contains some dark pixels and some bright pixels from Row 0 to Row N. As such, the curve 186 of FIG. 14 initially shows a relatively low total luminance over one frame at the start of the programming of the current frame 172. That is, when the current frame 172 begins to be programmed, the total luminance of the electronic display 12 is due entirely to the previous frame 170. Since the first several rows of image data of the current frame 172 programmed into the electronic display 12 are the same as the first several rows of image data of the previous frame 170 that it is replacing, the total pixel luminance shown in the curve 186 initially remains the same. However, as seen by the curve 186 of FIG. 14, for rows where bright pixels of the current frame 172 begin replacing dark pixels from the previous frame 170, the total luminance of the electronic display 12 begins to increase.

Eventually, as more and more rows of display pixels change from dark (previous frame 170) to bright (current frame 172), the total luminance shown by the curve 186 increases to a point where luminance scaling is warranted. This point is labeled "1" in FIGS. 13 and 14. At point "1," the total luminance of curve 186 crosses the scaling threshold 188. The image data is scaled by an amount corresponding to the curve 206, which begins at point "1." Initially, the luminance scaling is relatively moderate, but the luminance scaling may become more severe as the total luminance of the curve 186 approaches the maximum total luminance 190. At point "2," the image data changes less between the previous frame 170 to the current frame 172. Thus, the amount of scaling may decrease. At point "3," the image data is the same for both the previous frame 170 and the current frame 172, so the total pixel luminance shown by the curve 186 does not change.

FIGS. 15-20 represent the types of scaling functions that may be applied to image data to prevent the electronic display 12 from drawing excessive power while under some conditions allowing for exceptionally high brightness under others. The scaling functions shown in FIGS. 15-20 represent scaling that may be applied based at least in part on instantaneous average pixel luminance (APL) for a particular global display brightness value (DBV). As may be appreciated, a collection of different functions for different global display brightness values may be used to form a two-dimensional lookup table indexed to instantaneous average pixel luminance and global display brightness value.

Figure 15:
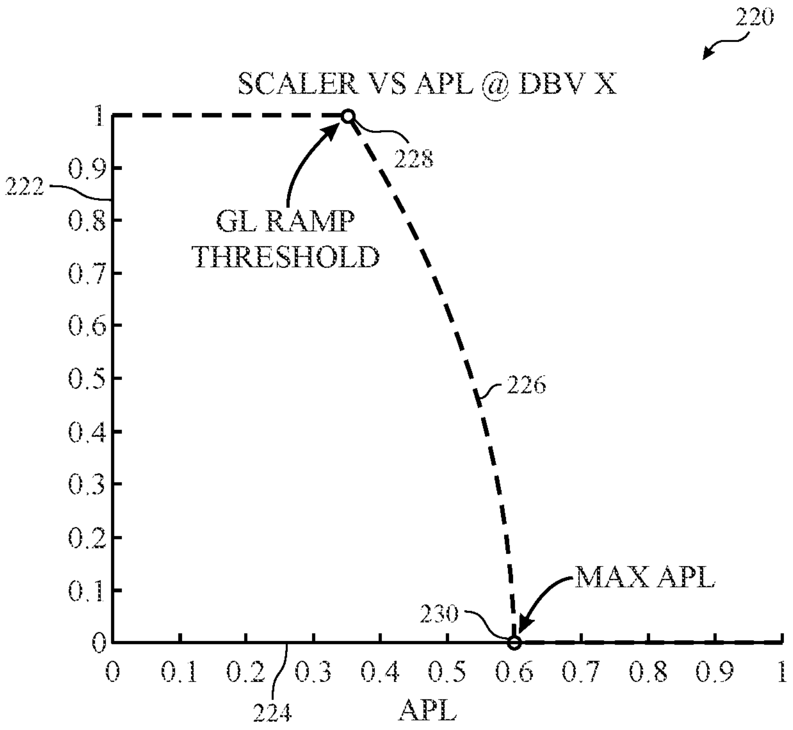
FIG. 15 represents an example plot for applying intra-frame luminance scaling as a function of instantaneous average pixel luminance for a particular global display brightness value, as used in the example of FIG. 13, in accordance with an embodiment.
Figure 16:
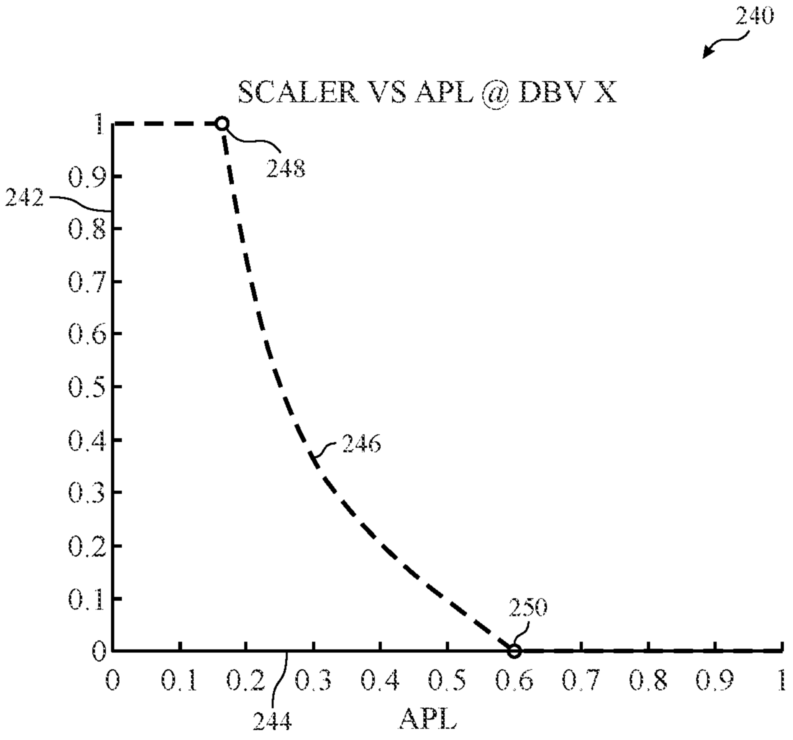
FIG. 16 represents another example plot for applying intra-frame luminance scaling as a function of instantaneous average pixel luminance for a particular global display brightness value, in accordance with an embodiment.
Figure 17:
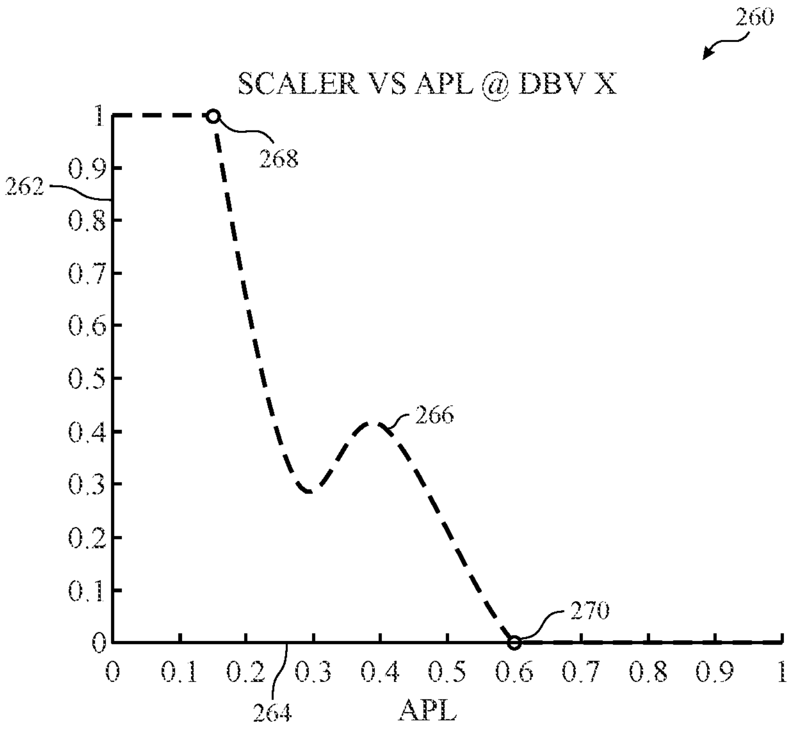
FIG. 17 represents another example plot for applying intra-frame luminance scaling as a function of instantaneous average pixel luminance for a particular global display brightness value, in accordance with an embodiment.

FIG. 15 is a plot 220 of scaling value (ordinate 222) in relation to instantaneous average pixel luminance (abscissa 224) for a particular global display brightness value (DBV "X"). A curve 226 represents a scaling value that is applied depending on the instantaneous average pixel luminance. As shown by the curve 226, as the instantaneous average pixel luminance increases, the scaling value is initially 1, meaning no change to the image data. At a point 228, the curve 226 reaches a gray level ramp threshold, marking an instantaneous average pixel luminance beyond which the luminance of the image data may begin to be scaled. This may continue according to any suitable function (here, one that scales down more rapidly as instantaneous average pixel luminance increases) until reaching a maximum instantaneous average luminance at point 230. The point 230 represents the maximum instantaneous average luminance that the electronic display 12 can sustain at this global display brightness value (DBV "X"). Beyond the point 230, the curve 226 corresponds to a scale value of "0" that is applied to the image data to prevent the electronic display 12 from drawing too much power from the power supply. As may be appreciated, the gray level ramp threshold of point 228 and the maximum instantaneous average luminance of point 230 may differ for different values of the global display brightness value. Likewise, the particular function to ramp down scaling values between the points 228 and 230 may also differ for different values of the global display brightness value.

Indeed, any suitable functions for scaling the luminance of image data for display on the electronic display may be used. In an example shown in FIG. 16, a plot 240 illustrates scaling value (ordinate 242) in relation to instantaneous average pixel luminance (abscissa 244) for a particular global display brightness value (DBV "X"). A curve 246 represents a scaling value that is applied depending on the instantaneous average pixel luminance. A point 248 marks a gray level ramp threshold, representing an instantaneous average pixel luminance beyond which the luminance of the image data may begin to be scaled. A point 250 represents a maximum instantaneous average luminance that the electronic display 12 can sustain at this global display brightness value (DBV "X"). From the point 248, the curve 246 initially scales more rapidly in relation to instantaneous average pixel luminance before scaling more slowly until reaching the point 250.

The luminance scaling function may or may not scale the image data monotonically with respect to instantaneous average pixel luminance. In an example shown in FIG. 17, a plot 260 illustrates scaling value (ordinate 262) in relation to instantaneous average pixel luminance (abscissa 264) for a particular global display brightness value (DBV "X"). A curve 266 represents a scaling value that is applied depending on the instantaneous average pixel luminance. A point 268 marks a gray level ramp threshold, representing an instantaneous average pixel luminance beyond which the luminance of the image data may begin to be scaled. A point 270 represents a maximum instantaneous average luminance that the electronic display 12 can sustain at this global display brightness value (DBV "X"). From the point 268, the curve 266 may decrease, then increase, then decrease again until reaching the point 270.

Figure 18:
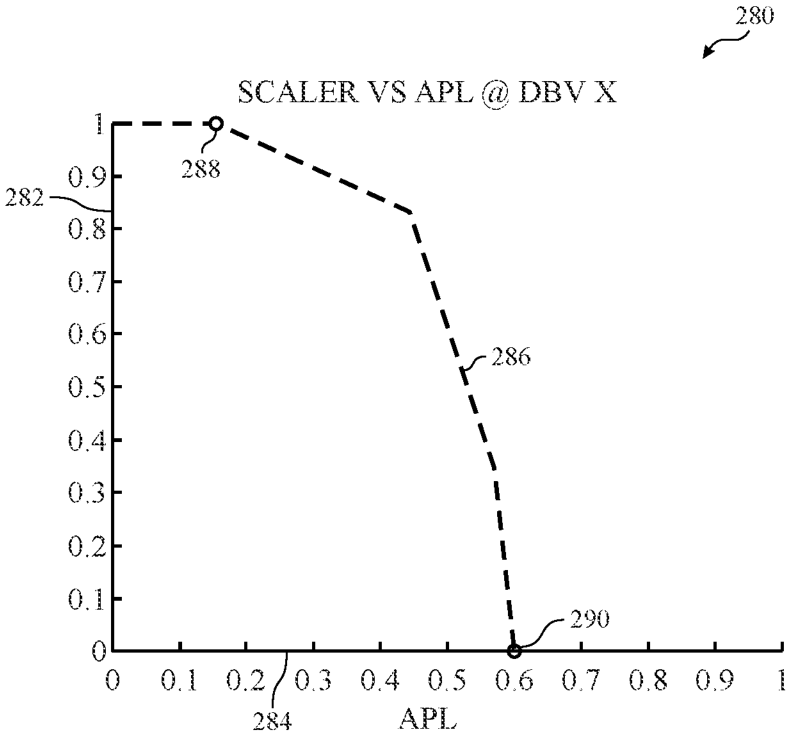
FIG. 18 represents another example plot for applying intra-frame luminance scaling as a function of instantaneous average pixel luminance for a particular global display brightness value, in accordance with an embodiment.
Figure 19:
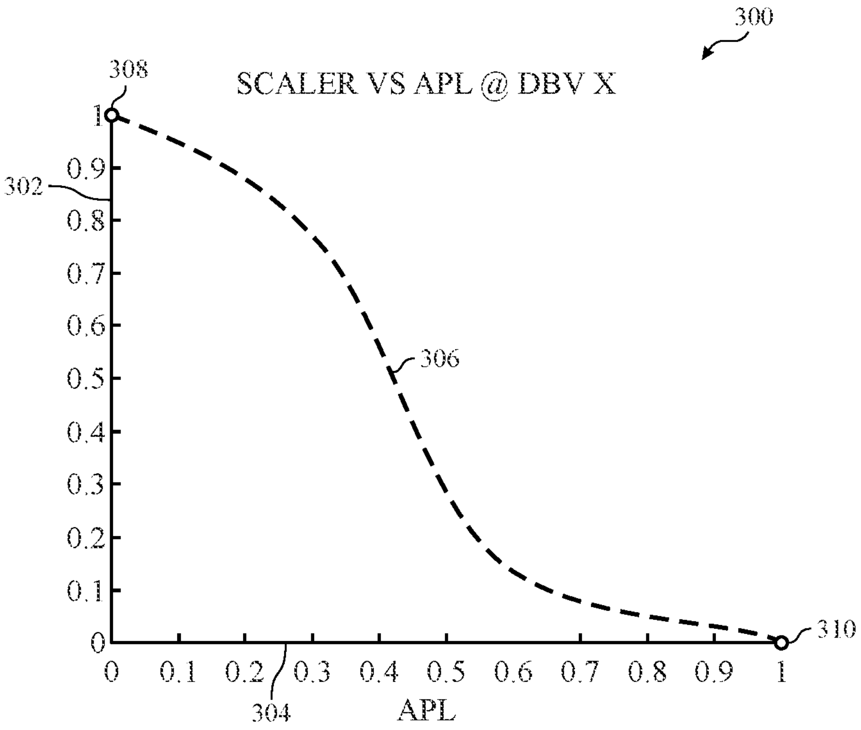
FIG. 19 represents another example plot for applying intra-frame luminance scaling as a function of instantaneous average pixel luminance for a particular global display brightness value, in accordance with an embodiment.

The luminance scaling function may be piecewise, as illustrated by a plot 280 of FIG. 18. In the example shown in FIG. 18, the plot 280 illustrates scaling value (ordinate 282) in relation to instantaneous average pixel luminance (abscissa 284) for a particular global display brightness value (DBV "X"). A curve 286 represents a scaling value that is applied depending on the instantaneous average pixel luminance. A point 288 marks a gray level ramp threshold, representing an instantaneous average pixel luminance beyond which the luminance of the image data may begin to be scaled. A point 290 represents a maximum instantaneous average luminance that the electronic display 12 can sustain at this global display brightness value (DBV "X"). From the point 288, the curve 286 may have one or more piecewise linear segments that each may have its own function. In this example, there are three linear segments with fixed slopes. In other examples, however, there may be any suitable number of segments, and each segment may be different functions with changing slopes.

For certain global display brightness values, the luminance scaling function may scale all image data, even when the instantaneous average pixel luminance is relatively low. In an example shown in FIG. 19, a plot 300 illustrates scaling value (ordinate 302) in relation to instantaneous average pixel luminance (abscissa 304) for a particular global display brightness value (DBV "X"). A curve 306 represents a scaling value that is applied depending on the instantaneous average pixel luminance. A point 308 marks a gray level ramp threshold, representing an instantaneous average pixel luminance beyond which the luminance of the image data may begin to be scaled. A point 310 represents a maximum instantaneous average luminance that the electronic display 12 can sustain at this global display brightness value (DBV "X"). From the point 308, the curve 306 may decrease according to any suitable function until reaching the point 310.

Figure 20:
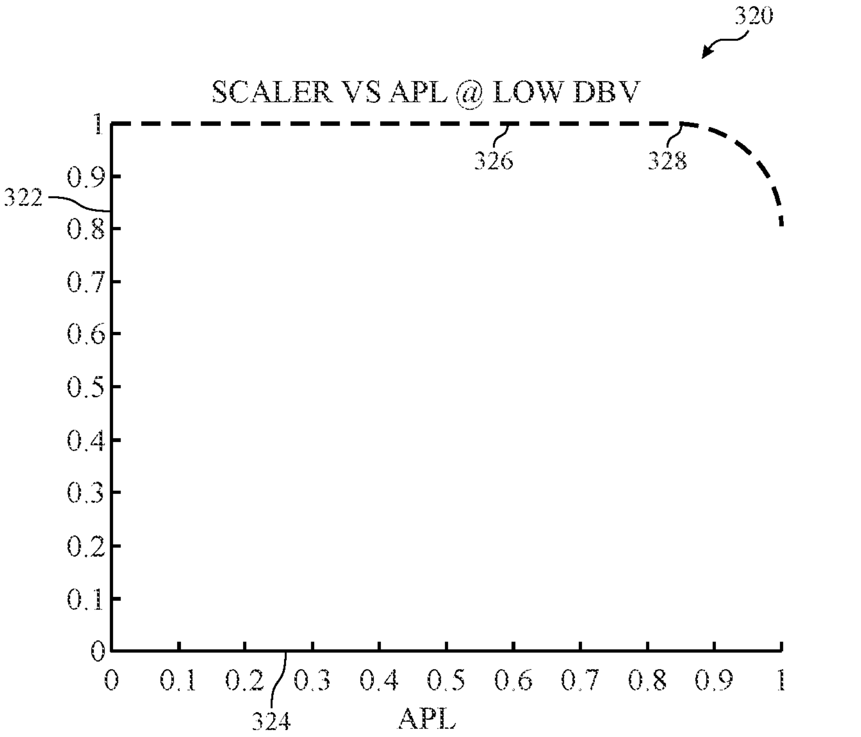
FIG. 20 represents another example plot for applying intra-frame luminance scaling as a function of instantaneous average pixel luminance for a particular global display brightness value, in accordance with an embodiment.

For particularly low global display brightness values, the luminance scaling function may only begin to scale image data when the instantaneous average pixel luminance is particularly high. One example is shown in FIG. 20. In the example of FIG. 20, a plot 320 illustrates scaling value (ordinate 322) in relation to instantaneous average pixel luminance (abscissa 324) for a global display brightness value that is among the lower possible global display brightness values. A curve 326 represents a scaling value that is applied depending on the instantaneous average pixel luminance. A point 328 marks a gray level ramp threshold, representing an instantaneous average pixel luminance beyond which the luminance of the image data may begin to be scaled. With this luminance scaling applied, the electronic display 12 at this global display brightness value may not reach a maximum instantaneous average luminance. Thus, the curve 326 may not scale the image data to "0," even at the maximum instantaneous average pixel luminance.

Figure 21:
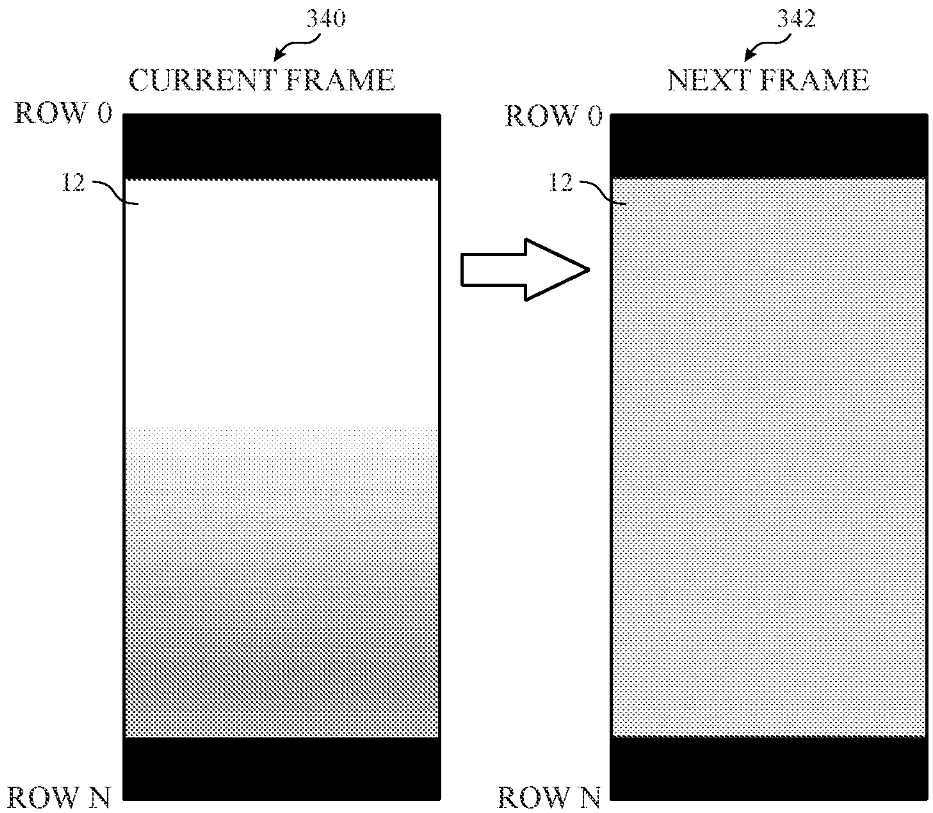
FIG. 21 illustrates an example of adjusting a global display brightness value from a current frame to a next frame based at least in part on intra-frame luminance scaling in the current frame, in accordance with an embodiment.

In the event that the intra-frame luminance scaling 74 causes the luminance of the image data to be scaled down, the global display brightness value may be reduced in a subsequent frame. An example is shown in FIG. 21, where a current frame 340 on the electronic display 12 has been scaled. In a next frame 342, the global display brightness value may be set lower, so that luminance scaling may be avoided for the next frame 342.

Figure 22:
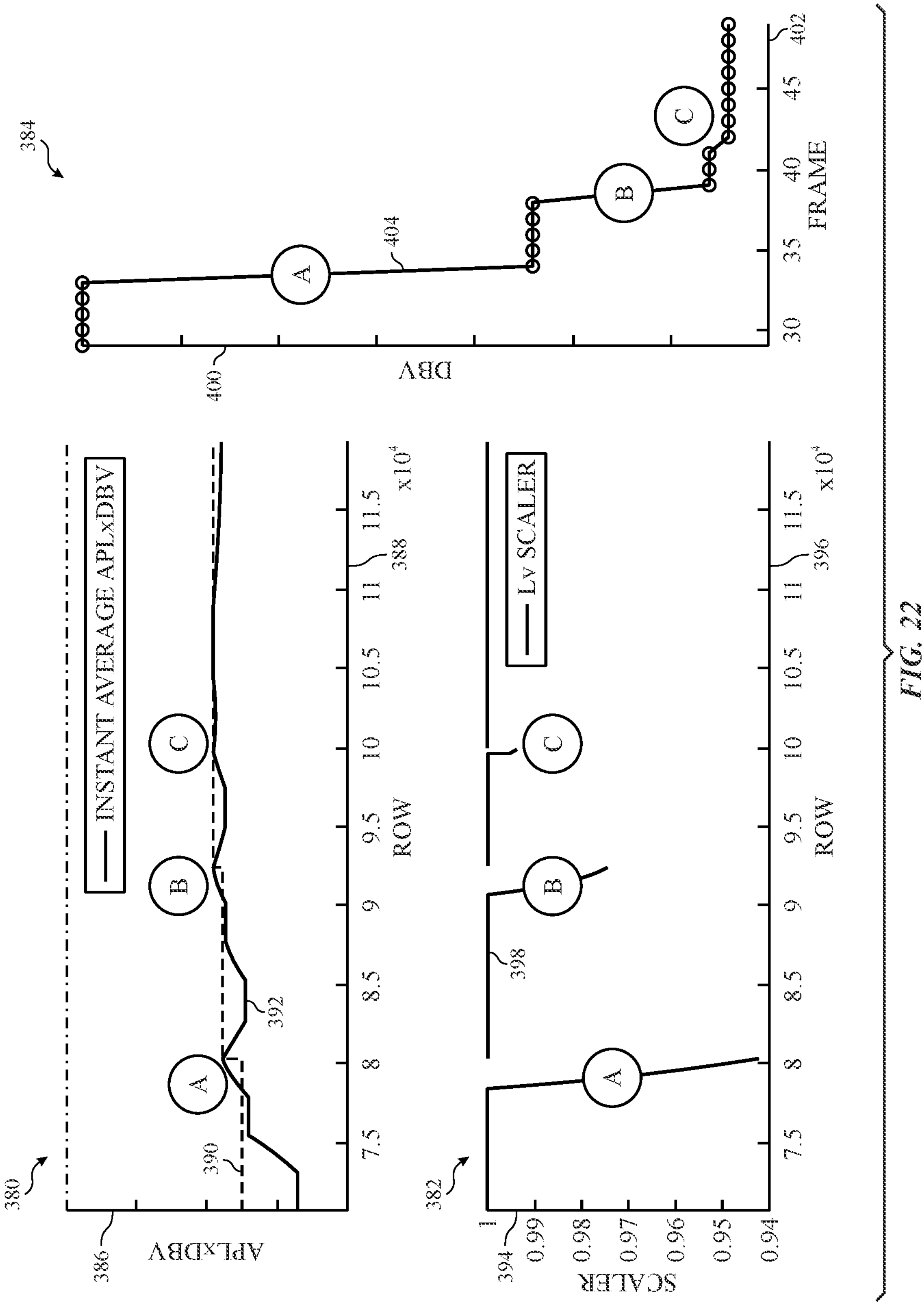
FIG. 22 represents a series of plots that illustrate another example of adjusting the global display brightness value of the electronic display over a series of image frames, in accordance with an embodiment.

A series of plots 380, 382, and 384 of FIG. 22 provide another example of how the global display brightness value may be changed over a number of many image frames. The plot 380 represents the total instantaneous luminance emitted by the electronic display 12 (instantaneous average pixel luminance (APL) multiplied by the global display brightness value (DBV)) (ordinate 386) in relation to rows programmed into the electronic display 12 (abscissa 388). The abscissa 388 represents 10,000*s* of rows of image data programmed onto the electronic display 12, such that the plot 380 represents approximately 20 or so frames of image data.

A scaling threshold 390 marks a total luminance above which point luminance scaling is used in an effort to avoid reaching a maximum total luminance. As can be seen in the plot 380, the scaling threshold 390 changes as thousands of rows (many image frames) are programmed over time onto the electronic display 12. This corresponds to changes in global display brightness values for different image frames, occurring at point "A," point "B," and point "C." These points are also seen in the plots 382 and 384, discussed further below. A curve 392 represents the total luminance (e.g., the instantaneous average pixel luminance (APL) as multiplied by the global display brightness value (DBV)) emitted by the electronic display 12 at the point of programming display pixels of a particular row.

The plot 382 represents a scaling value applied to image data (ordinate 394) in relation to rows programmed into the electronic display 12 (abscissa 396). The abscissa 396 also represents 10,000*s* of rows of image data programmed onto the electronic display 12 and corresponds to the same 20 or so frames of image data as in the plot 380. A curve 398 illustrates the way that luminance scaling may be applied to image data by the intra-frame luminance scaling 74 as different frames of image data are provided to the electronic display 12. At point "A," point "B," and point "C," luminance scaling takes place to prevent the electronic display 12 from drawing too much power from the power supply 26.

As shown in the plot 384, which shows the global display brightness value (DBV) (ordinate 400) for a current image frame (abscissa 402), it is in response to this image data that the global display brightness value may be reduced. As shown by a curve 404 of the plot 384, the global display brightness value may drop at point "A," then at point "B," and then again at point "C." As a consequence, as shown in the plot 380, the scaling threshold 390 may be increased. As mentioned above, the global display brightness value may be reduced so that a subsequent image frame (e.g., the next image frame or another future image frame) may avoid luminance scaling if the image data remained the same. In another example, the global display brightness value for a subsequent image frame may be selected to result in some threshold amount of luminance scaling if the image data remained the same.

Slow Luminance Control System

Turning now to slow luminance control operations, an electronic device may use a variety of factors to select a longer-term (e.g., over many frames) global display brightness value (DBV). For example, an electronic device may have an ambient light sensor, a display that displays image content, and control circuitry. The control circuitry may adjust a peak allowable brightness of the display based on an ambient light brightness and based on the image content being displayed. For example, the control circuitry may analyze frames of display data to determine an average pixel luminance level. Low average pixel luminance levels correspond to mostly dark image content, whereas high average pixel luminance levels correspond to mostly light image content. When an electronic device is outdoors and displaying mostly dark images with low average pixel luminance levels, the control circuitry may take advantage of the display's maximum achievable brightness to improve readability. When an electronic device is outdoors and displaying mostly light images with high average pixel luminance levels, the control circuitry may scale the maximum allowable brightness down to reduce power consumption.

Control circuitry in the electronic device may be used in implementing a tone mapping engine. The tone mapping engine may select a content-luminance-to-display luminance mapping to be used in displaying content on the display from the content generator. The content-luminance-to-display-luminance mapping may be characterized by tone mapping parameters such as a black level, a white level, and/or a peak brightness setting.

During operation, the tone mapping engine may adjust the tone mapping parameters based on ambient light levels and image content. For example, the control circuitry may analyze frames of display data to determine an average pixel luminance level, a median pixel brightness level, or other pixel brightness parameter associated with image content. Low average pixel luminance levels correspond to mostly dark image content, whereas high average pixel luminance levels correspond to mostly light image content.

When an electronic device is outdoors and displaying mostly dark images with low average pixel luminance levels, the control circuitry may take advantage of the display's maximum achievable brightness to improve readability. When an electronic device is outdoors and displaying mostly light images with high average pixel luminance levels, the control circuitry may scale the maximum allowable brightness down to reduce power consumption. The control circuitry may reduce the maximum allowable brightness of the display by multiplying a brightness scaling factor (e.g., ranging from 0 to 1) with the maximum achievable brightness of the display. The control circuitry may determine the brightness scaling factor based on the average pixel luminance levels. For example, a greater amount of white or light content in an image may use a lower brightness scaling factor (and thus a lower peak allowable brightness) to conserve power.

If desired, the control circuitry may only impose this type of content-dependent peak brightness adjustment when the user has enabled such a feature (e.g., when the user has enabled a dark viewing mode in which images are inverted or partially inverted so that the images are mostly dark content).

The control circuitry may apply a temporal low-pass filter so that the shifts between different peak brightness settings do not occur too rapidly.

Figure 23:
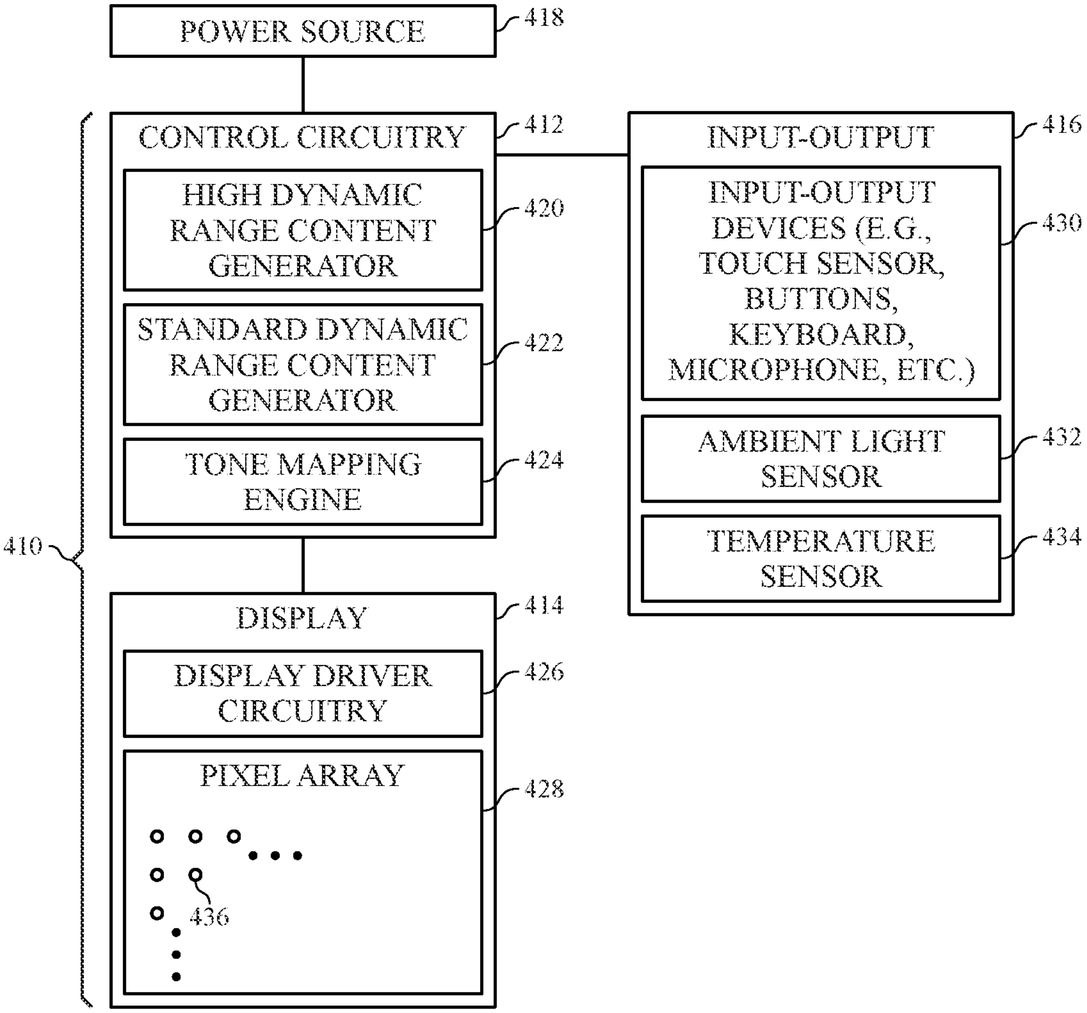
FIG. 23 is a schematic diagram of an illustrative electronic device having a display, in accordance with an embodiment.

An illustrative electronic device of the type that may be provided with a display is shown in FIG. 23. As shown in FIG. 23, electronic device 410 may have control circuitry 412. The electronic device 410 may correspond to the electronic device 10 and the control circuitry 412 may correspond to the processor core complex 18 and storage devices 22 and/or memory 20. Control circuitry 412 may include storage and processing circuitry for supporting the operation of device 410. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 412 (e.g., processor core complex 18) may be used to control the operation of device 410. The processing circuitry may be based on one or more microprocessors, microcontrollers, digital signal processors, baseband processors, power management units, audio chips, application-specific integrated circuits, graphics processing units, display driver circuitry such as timing controller integrated circuits and other display driver integrated circuits, and other control circuitry.

Control circuitry 412 is configured to execute instructions for implementing desired control and communications features in device 410. For example, control circuitry 412 may be used in determining pixel luminance levels that are to be used in displaying content for a user. Pixel luminance levels may be based, for example, on ambient light conditions, user-adjusted display brightness settings, statistical information associated with content that is being displayed, and display characteristics. Control circuitry 412 may be configured to perform these operations using hardware (e.g., dedicated hardware such as integrated circuits and thin-film circuits) and/or software (e.g., code that runs on control circuitry 412). Software code for performing control and communications operations for device 410 may be stored on non-transitory computer readable storage media (e.g., tangible computer readable storage media). The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, other computer readable media, or combinations of these computer readable media or other storage. Software stored on the non-transitory computer readable storage media may be executed on the processing circuitry of control circuitry 412 during operation of device 410.

Input-output circuitry 416 (e.g., input devices 14) in device 410 may be used to allow data to be supplied to device 410 from a user or external equipment, may be used to gather environmental data, and may be used to supply data to external equipment and output for a user. Input-output circuitry 416 may include input-output devices 430 such as buttons, joysticks, scrolling wheels, touch pads, key pads, keyboards, microphones, speakers, tone generators, vibrators, cameras, sensors, light-emitting diodes and other status indicators, touch sensitive displays (e.g., touch sensors overlapping pixel arrays in displays), data ports, etc. As shown in FIG. 23, input-output circuitry 416 may include a color ambient light sensor or other ambient light sensor 432 for gathering ambient light measurements (e.g., ambient light levels such as ambient light luminance measurements and/or ambient light color measurements such as color temperature measurements and/or color coordinate measurements). Input-output circuitry 416 may also include temperature sensor circuitry such as one or more temperature sensors. Temperature sensors such as temperature sensor 434 may be used to gather real time information on the operating temperature of device 410 and display(s) associated with device 410.

Power may be supplied to control circuitry 412 and other resources in device 410 using one or more power sources such as power source 418. Power source 418 may be an alternating-current (AC) source such as a wall outlet (mains supply), a power management integrated circuit (PMIC), and/or a direct-current (DC) source such as a battery. During operation, control circuitry 412 can detect whether power is being received from (e.g., such as distinguish between an AC or DC source), can monitor the charge state of the battery, and the like.

Device 410 may include one or more internal and/or one or more external displays such as illustrative display 414 (e.g., display 12). Display 414 may be mounted in a common housing with device 410 (e.g., when device 410 is a mobile device such as a cellular telephone, wristwatch device, tablet computer, or laptop computer or when device 410 is an all-in-one device such as a television or desktop computer). In other configurations, display 414 may be coupled to device 410 wirelessly or with a cable (e.g., when device 410 is a desktop computer or a set-top box).

In general, device 410 may be any suitable type of device, such as described with reference to electronic device 10 in FIGS. 2-5. Device 410 may, for example, be a computing device laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. Device 410 (e.g., a portable device) may be exposed to a variety of environmental conditions. For example, ambient light levels and therefore display glare may vary as a portable device is moved between indoors and outdoors environments (as an example).

Electronic device may have a housing. The housing, which may sometimes be referred to as an enclosure or case, may be formed of plastic, glass, ceramics, fiber composites, metal (e.g., stainless steel, aluminum, etc.), other suitable materials, or a combination of any two or more of these materials. The housing may be formed using a unibody configuration in which some or all of the housing is machined or molded as a single structure or may be formed using multiple structures (e.g., an internal frame structure, one or more structures that form exterior housing surfaces, etc.). In laptop computers and other foldable devices, a first portion of the housing may rotate relative to a second portion of the housing (e.g., a display housing in a laptop computer may rotated about a hinge axis relative to a base housing in the laptop computer).

Display 414 may be mounted in the housing. Display 414 may have a rectangular outline and be surrounded by four peripheral edges, may have a shape that is circular or oval, or may have other suitable outlines. Display 414 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 414 may have an array 428 of pixels 436 (e.g., display pixels 54) for displaying images for a user (e.g., video, graphics, text, etc.). Display driver circuitry 426 (e.g., thin-film transistor circuitry on display 414 and/or one or more timing-controller integrated circuits and/or other display driver integrated circuits) may be used to display images on pixel array 428 and may correspond to data driver 52 and/or scan driver 50. Pixel array 428 may include, for example, hundreds or thousands of rows and hundreds or thousands of columns of pixels 436. To display color images, each pixel 436 may include subpixels of different colors. For example, each pixel 436 may include, red, green, and blue subpixels or subpixels of different colors. By varying the relative intensity of light emitted by each subpixel in a pixel, pixel output color can be adjusted. The color cast (white point) of each pixel can be adjusted by modifying the gain associated with each subpixel.

The pixel array 428 of display 414 may be formed from liquid crystal display (LCD) components, an array of electrophoretic display pixels, an array of plasma display pixels, an array of organic light-emitting diode pixels or other light-emitting diodes, an array of electrowetting display pixels, or pixels based on other display technologies. Display 414 may be backlit with an array of locally dimmable light-emitting diodes or other suitable backlight structures. Display 414 may display images with a standard dynamic range (e.g., images that exhibit a contrast ratio of about 1,000:1 between their brightest and darkest pixel luminance values) and/or may display images with a high dynamic range (e.g., images that exhibit a contrast ratio of about 10,000:1 or more between their brightest and darkest luminance values).

During operation, content generators in device 410 (e.g., operating system functions and/or applications running on control circuitry 412) may generate content for display on the pixel array of display 414. As an example, electronic device 410 may include one or more standard dynamic range (SDR) content generators (e.g., games or other code rendering content, content players, etc.) and/or more high dynamic range (HDR) content generators (e.g., games or other code rendering content, content players, etc.). A luminance value mapping engine such as tone mapping engine 424 may be used to provide content generators with tone mapping parameters (sometimes referred to as luminance value mapping parameters) indicating how the content generators should map content luminance values to display luminance values and/or may be used to directly perform content-luminance-to-display-luminance mapping operations on content luminance values from the content generators. For example, tone mapping engine 424 may supply content generators with tone mapping parameters such as a black level, white level, and/or a peak brightness setting to use in producing display luminance values for use in displaying images with pixels 436. Tone mapping engine 424 may be implemented using code running on control circuitry 412 of FIG. 23, control circuitry for device 410 such as display driver circuitry 426, and/or other control circuitry and/or may use hardwired features of the control circuitry in device 410. The tone mapping parameters may be expressed in any suitable format (e.g., cd/m2, nits, or other suitable unit).

Standard dynamic range content is often encoded in grey levels (e.g., 0-255 in an 8-bit display), where 0 corresponds to dark black and 255 corresponds to bright white. High dynamic range content is often encoded in luminance levels for each pixel (generally to be displayed for standard viewing conditions such as dim viewing conditions). Device 410 may experience changes in ambient lighting conditions, user brightness settings may be adjusted up and down by a user, the content being displayed on display 414 may exhibit changes such as changes in average pixel luminance, burn-in risk, image quality, and other conditions related to the presentation of content on display 414 may change over time. Device 410 may use tone mapping engine 424 to ensure that content is rendered appropriately for displaying on display 414 in view of these potentially changing conditions and other criteria such as the characteristics of display 414.

In some arrangements, tone mapping parameters produced by tone mapping engine 424 may include brightness parameters such as a peak brightness setting. The peak brightness setting of display 414 may refer to the maximum allowable brightness of any given pixel in display 414. The maximum allowable brightness of a pixel may refer to the brightness produced by that pixel when the pixel displays white. For example, in a 8-bit display with pixels that contain red, green, and blue subpixels, the maximum allowable brightness may refer to the brightness produced by that pixel when the red, green, and blue subpixels receive digital display control values of 255 (corresponding to the color white). In contrast, the maximum achievable brightness of a display 414 and/or a pixel in display 414 may refer to the maximum brightness that the display or pixel is physically capable of producing. The maximum allowable brightness of display 414 may, in some instances, be equal to the maximum achievable brightness of display 414. In other scenarios, the maximum allowable brightness of display 414 may be less than the maximum achievable brightness of display 414 (e.g., to conserve power in bright outdoor light when display 414 is displaying mostly light image content).

The peak brightness of display 414 (sometimes referred to as the maximum allowable brightness, the peak allowable brightness, the white level, or the peak brightness setting) may be expressed in any suitable format. In some arrangements, the peak brightness may be expressed as a peak brightness value (e.g., 6,500 nits, 1,200 nits, etc.).

In other arrangements, the peak brightness may be expressed as a factor of the maximum brightness of which display 414 is capable (i.e., the maximum achievable brightness of display 414). The peak brightness factor (sometimes referred to as a brightness scaling factor or peak brightness scaling factor) may range from 0 to 1 and may be multiplied by the maximum achievable brightness of display 414 to obtain the maximum allowable brightness level. Thus, in a display that can achieve 1,200 nit brightness levels, a peak brightness factor of 1 indicates that the maximum allowable brightness of display 414 is equal to 1,200 nits, whereas a peak brightness factor of 0.8 would result in a peak allowable brightness of 960 nits (0.8*1,200 nits=960 nits).

In outdoor environments, control circuitry 412 may increase display brightness in order to maintain good readability in bright ambient light. If care is not taken, however, sustaining high display brightness for long periods of time may lead to aging effects, excessive device temperatures, reduced battery life, increased burn-in risk, etc. Control circuitry 412 may use tone mapping engine 424 to produce brightness parameters that achieve good readability in bright ambient light without compromising the health of display 414 and/or device 410. For example, control circuitry 412 may use a brightness setting (e.g., a peak brightness setting) that is based on the content being displayed on display 414 (e.g., based on whether the content on display 414 is mostly light content or mostly dark content, based on whether the content on display 414 is mostly color content or mostly black and white content, based on the average pixel luminance levels associated with the content on display 414, based on median pixel luminance levels associated with the content on display 414, and/or based on other information associated with the content on display 414).

Figure 24:
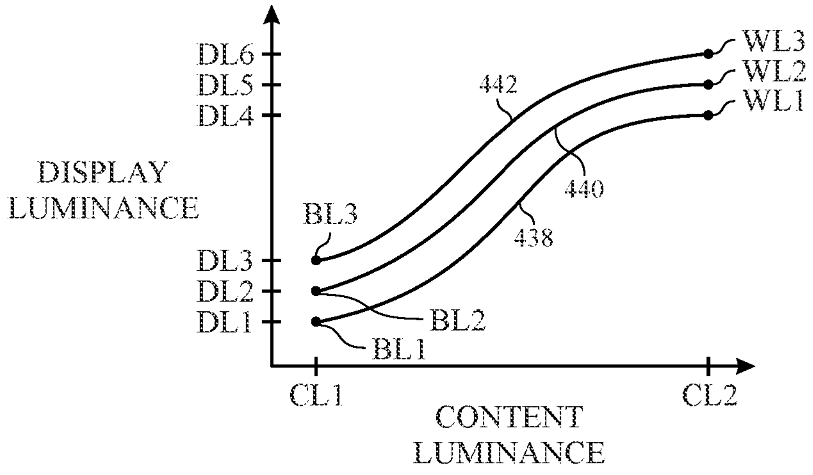
FIG. 24 is a graph showing how content luminance may be mapped to display luminance according to different peak brightness settings, in accordance with an embodiment.

FIG. 24 is a graph showing how content luminance values can be mapped to display luminance values in device 410 in accordance with three illustrative content-luminance-to-display-luminance mapping curves (sometimes referred to as tone mapping curves). The content luminance and display luminance axes of the graph of FIG. 24 have logarithmic scales. In the FIG. 24 example, each content-luminance-to-display-luminance mapping curve is associated with a different peak brightness setting. When a low peak brightness setting is selected, display 414 displays content in accordance with curve 438. When a moderate peak brightness setting is selected, display 414 displays content in accordance with curve 440. When a high peak brightness setting is selected, display 12 displays content in accordance with curve 442.

In each of these curves, low content luminance values are associated with black and low grey levels, and high content luminance values are associated with white and high gray levels. At black content luminance level CL1, curve 438 is associated with a display pixel luminance value of DL1, curve 440 is associated with a display pixel luminance value of DL2, and curve 442 is associated with a display pixel luminance value DL3. The luminance level DL2 is brighter than luminance level DL1, because curve 440 is associated with a brighter set of output luminance from pixels 436 than curve 438. Similarly, luminance level DL3 is brighter than luminance level DL2 because curve 442 is associated with a brighter set of output luminance from pixels 36 than curve 440. At white content luminance level CL2, curve 438 is associated with a display pixel luminance value of DL4, curve 440 is associated with a display pixel luminance value of DL5, and curve 442 is associated with a display pixel luminance value DL6.

The example of FIG. 24 in which curves 438, 440, and 442 have different black levels for the same content luminance value CL1 and different white levels for the same content luminance value CL2 is merely illustrative. If desired, curves 438, 440, and 442 may have the same luminance level (e.g., black level) at content luminance value CL1 and different luminance levels (e.g., white levels) at content luminance value CL2, or curves 438, 440, and 442 may have different luminance levels at content luminance value CL1 and the same luminance level at content luminance value CL2.

Tone mapping curves may be identified using a set of tone mapping parameters such as a black level (BL) and a white level (WL). In the example of FIG. 24, curve 438 is associated with black level BL1 and white level WL1; curve 440 is associated with black level BL2 and white level WL2; and curve 442 is associated with black level BL3 and white level WL3. These examples are merely illustrative, however. As discussed above, curves 438, 440, and 442 may have the same black level (e.g., BL1) and different white levels (e.g., WL1, WL2, and WL3), if desired, or vice versa.

If desired, tone mapping curves such as curves 438, 440, and 442 may be identified using other tone mapping parameters such as a peak brightness setting. For example, curve 438 may be identified using a peak brightness setting equal to DL4, which indicates that the maximum allowable brightness of pixels 436 is DL4 (e.g., 80% of the maximum brightness of which pixels 436 are capable, as an example); curve 440 may be identified using a peak brightness setting equal to DL5 (e.g., 90% of the maximum brightness of which pixels 436 are capable, as an example); and curve 442 may be identified using a peak brightness setting equal to DL6 (e.g., 100% of the maximum brightness of which pixels 436 are capable, as an example). In general, any suitable parameter may be used to identify the appropriate tone mapping curve with which content should be displayed on display 414. Arrangements in which tone mapping parameters include a peak brightness setting may sometimes be described herein as an illustrative example.

During operation, engine 424 may supply content generators such as content generators 420 and/or 422 with suitable values of these tone mapping parameters, thereby informing content generators 420 and/or 422 whether to use curve 438, curve 440, or curve 442. If, for example, engine 424 supplies a content generator with tone mapping parameters BL1, WL1, and/or DL4, the content generator can generate display luminance values from content luminance values following curve 438. If engine 424 supplies the content generator with tone mapping parameters BL2, WL2, and/or DL5, the content generator can generate display luminance values from content luminance values following curve 440. The content generator can generate display luminance values from content luminance values following curve 442 in response to tone mapping parameters BL3, WL3, and/or DL6 from engine 424. In this way, a set of tone mapping parameters (e.g., three or more tone-mapping parameters, 3-10 tone-mapping parameters, fewer than 5 tone-mapping parameters, etc.) can be used by engine 424 to specify a desired tone mapping relationship for the content generator to follow depending on current operating conditions.

If desired, user studies, modeling, and laboratory testing may be used to help establish desired tone mapping schemes for device 410 under a variety of operating conditions (e.g., user brightness settings, ambient light levels, display content, and other operating conditions). These tone mapping schemes can then be implemented by tone mapping engine 424.

With one illustrative configuration, tone mapping engine 424 can select a desired tone mapping curve based on operating conditions such as display brightness settings (e.g., user-defined brightness settings and brightness levels set by device 410 to accommodate a normal power operating mode and a low-power operating mode), ambient conditions (ambient light level and ambient light color), image content information (e.g., information on average pixel luminance, information on median pixel luminance, information on amounts of color content, information on amounts of black and white content, information on which application is displaying content on display 414, burn-in risk information, and/or other information on operating conditions having a potential impact on display lifetime, quality information, dynamic range information etc.), display characteristics (e.g., display limitations such as maximum achievable pixel luminance), power constraints (e.g., battery life, whether device 410 is operating on AC power or DC power such as power from the battery in source 418 of device 410), thermal limitations, etc.

During operation, tone mapping engine 424 may obtain information on these operating conditions and may take suitable action to ensure that display 414 displays images satisfactorily. Tone mapping engine 424 may, as an example, remap content so that luminance values that are too high when output from a content generator are reduced by engine 424 before these values are used by display 414. Tone mapping engine 424 may also provide content generators such as content generators 420 and/or 422 with tone mapping parameters that inform the content generators of a desired content-luminance-to-display-luminance mapping curve to be used in displaying images on display 414.

Figure 25:
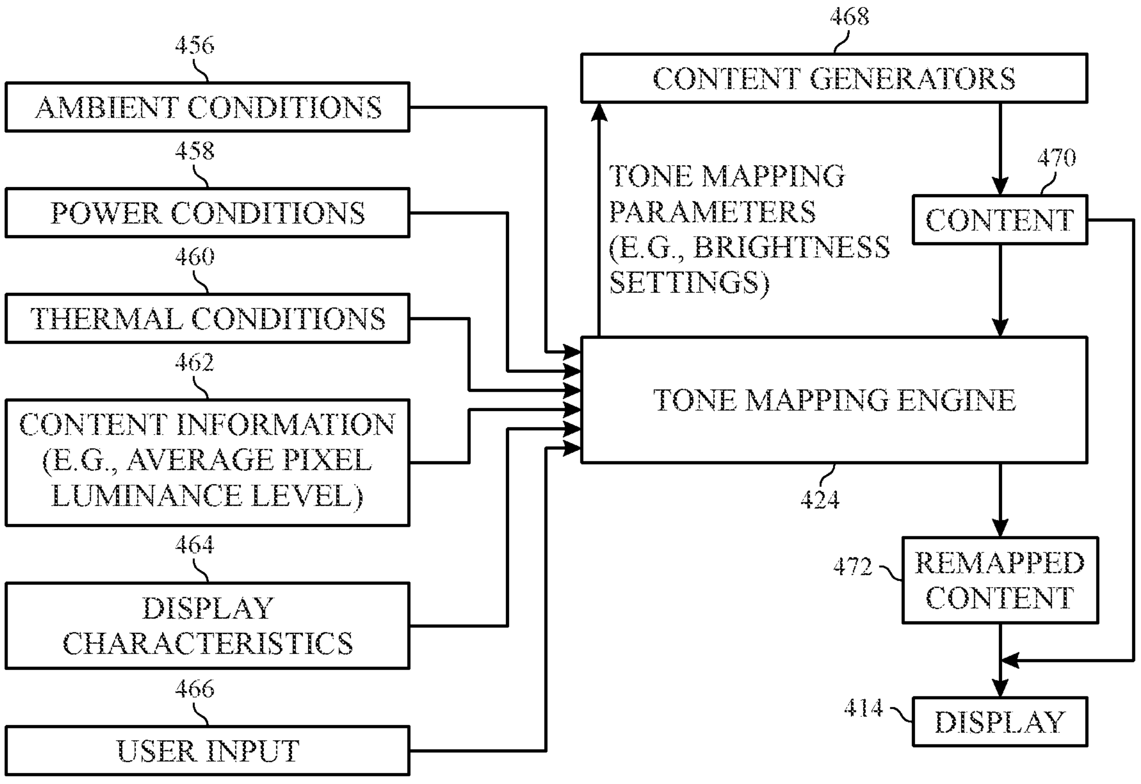
FIG. 25 is a diagram showing how a tone mapping engine may use ambient light information and image content information to determine tone mapping parameters such as a peak brightness setting, in accordance with an embodiment.

FIG. 25 is a diagram showing how tone mapping engine 424 may receive one or more inputs, such as ambient conditions 456, power conditions 458, thermal conditions 460, content information 462, display characteristics 464, and user input 466. As described below further with reference to FIG. 30, there may be some systems where the tone mapping engine 424 is implemented in a dual-control system and/or receives accumulated energy and/or an indication of a battery life so far. The tone mapping engine 424 may generate the remapped content 472 based on the ambient conditions 456, power conditions 458, thermal conditions 460, content information 462, display characteristics 464, user input 466, the accumulated energy, the indication of the battery life, or the like.

Ambient conditions 456 may include a current ambient light level measured with ambient light sensor 432 and/or a current ambient color (e.g., a color temperature, set of color coordinates, etc.) measured with ambient light sensor 432. As environmental brightness increases, display brightness can be increased to compensate for screen glare. As environmental color shifts (e.g., as a user moves device 410 from a warm indoor lighting environment to a cold outdoor lighting environment), the white point (color cast) of display 414 can be adjusted accordingly (e.g., shifted from a warm white to a cool white) to avoid undesired color cast effects in displayed images.

Power conditions 458 may include power consumption considerations such as a current battery level, whether device 410 is operating in a normal power mode or a low power mode, and/or other information relating to the battery life and power consumption of device 410. Power-consumption-based brightness level adjustments may be made by control circuitry 412 to help extend battery life. For example, control circuitry 412 may lower the brightness level for display 414 based on a detection that a user has placed device 410 in a low power mode to extend battery life. In low power mode, control circuitry 412 may lower the current display brightness setting, may impose a cap on the brightness level, and/or may reduce the luminance of specular highlights or may make other adjustments that help reduce the power consumption of display.

Thermal conditions 460 may include information such as a temperature level of device 410 measured with sensor 434. Control circuitry 412 may lower the brightness level for display 414 in response to a detection that a temperature level measured with sensor 434 has exceeded a predetermined level.

Content information 462 may be gathered by analyzing frames of image data produced by content generator(s) 468 (e.g., content generators such as content generators 420 and 422 of FIG. 23) that are being displayed on display 414. Control circuitry 412 (e.g., a microprocessor, display driver integrated circuits, graphics processing unit circuitry, and/or other control circuitry in device 410) may, for example, maintain running averages of image luminance values (e.g., a running average pixel luminance value for images being displayed on display 414 over multiple image frames) and/or may maintain historical luminance information in a more granular fashion (e.g., on blocks of one or more pixels 436 within pixel array 428) to quantify burn-in risk for each of these blocks. Other content statistics such as information on content quality such as bit depth, dynamic range of image input data (e.g., minimum, mean, and maximum value), compression type and amount, data rate, noise level, metadata-specified quality factors, and other content quality metrics can also be gathered and provided to tone mapping engine 424.

Display characteristics 464 may also be used by tone mapping engine 424. Display characteristics 464 may include information on physical display limitations for display 414. For example, display characteristics 464 may include information on the characteristics of pixel array 428 and display 414 (e.g., maximum achievable brightness, display resolution, contrast ratio, bit depth, etc.). These display characteristics may be stored in control circuitry 412 during manufacturing (e.g., when display 414 is built into device 410) and/or may be obtained from display 414 when display 414 is coupled to device 410 (e.g., when display 414 is a stand-alone display). A user may also supply control circuitry 412 with display characteristics information (e.g., by entering this information using a keyboard or other input-output device). In some configurations, display characteristics may be set by default and/or retrieved from a database of display characteristics maintained in device 410 (e.g., a database of stand-alone display models).

User input 466 may include a user-selected brightness level, a user-selected power mode, a user-selected color scheme (e.g., whether the user prefers dark text on a light background or light text on a dark background), a user-selecting dark viewing mode (e.g., whether the user has enabled a feature that inverts some or all image content so that images on display 414 are mostly dark), and/or other user input or stored user preferences that affect the operation of display 414 or device 410. User input may be touch screen user input, keyboard user input, button user input, and/or other user input.

During operation, content generators 468 may produce content 470 to be displayed on display 414. Image sources, such as content generators 468 may, for example, render game images in a video game, may retrieve stored movie data and provide corresponding video frames to be displayed on display 414, may produce still image frames associated with an operating system function or application program, and/or may produce other content for displaying on display 414. The content from content generators 468 may include standard dynamic range content and/or high dynamic range content.

Tone mapping engine 424 may use information on ambient conditions 456, power conditions 458, thermal conditions 460, content information 462, display characteristics 464, and user input 466 to determine how original content values should be mapped to display content values (e.g., to determine how to map content luminance values to display luminance values in accordance with mapping curves of the type described in connection with FIG. 24). To ensure that content is displayed appropriately on display 414, tone mapping engine 424 can provide content generators 468 with tone mapping parameters such as a peak brightness setting to use in performing luminance mapping operations and/or can implement luminance mapping for content generators 468.

In some configurations, content generators 468 may be capable of adjusting content luminance values internally. In these situations, tone mapping engine 424 can supply content generators 468 with tone mapping parameters such as a black level, a white level, a peak brightness setting, and/or other tone mapping parameters. The tone mapping parameters inform content generators 468 of an appropriate mapping curve to use in supplying content 470 to display 414.

In other configurations, content generators 468 may not be capable of adjusting content luminance values internally or it may otherwise be desirable to implement tone mapping separately from the tone mapping functions of content generators 468. In these circumstances, content 470 from content generator 468 may be provided to tone-mapping engine 424. Tone mapping engine 424 may then apply a desired content-luminance-to-display luminance mapping (e.g., a mapping defined by the tone mapping parameters such as a black level, a white level, and/or a peak brightness setting) to ensure that the luminance of content 470 is adjusted appropriately (e.g., so that content 470 is remapped in accordance with a desired content-luminance-to-display luminance mapping to produce corresponding remapped content 472 for displaying on display 414). In mapping the luminance values of content 470 to the new (remapped) luminance values of content 472, the content-luminance-to-display luminance mapping that is used by engine 424 may follow pre-defined parameters (e.g., default) tone mapping parameters or may use the same tone mapping parameters that engine 424 would provide to a content generator that is capable of adjusting content luminance values by applying the desired mapping internally.

Figure 26:
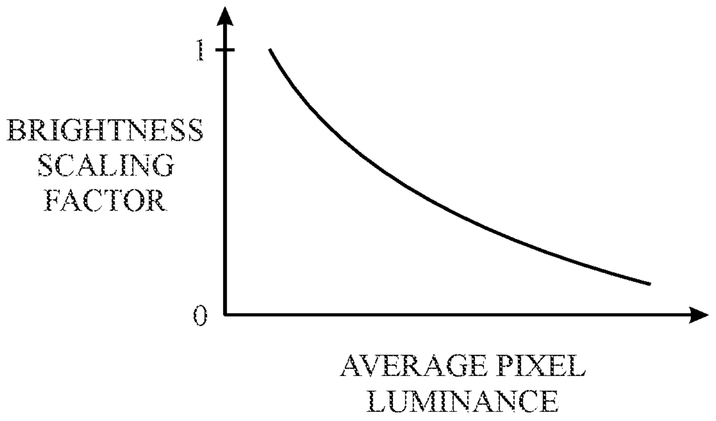
FIG. 26 is a graph showing how a brightness scaling factor may decrease as an average pixel luminance value increases, in accordance with an embodiment.

FIG. 26 is a graph showing how tone mapping parameters such as a peak brightness setting may be adjusted dynamically by engine 424 based on image content information such as average pixel luminance level. If desired, the peak brightness setting of display 414 may be based on other pixel brightness parameters such as a median pixel luminance level (e.g., the median pixel luminance level associated with one or more frames of display data) and/or may be based on other information about the image content on display 414. Arrangements in which the peak brightness setting of display 414 is adjusted based on average pixel luminance levels are sometimes described herein as an example. In particular, control circuitry 412 may apply a brightness scaling factor to the maximum achievable brightness or default brightness of display 414 based on the average pixel luminance level associated with images to be displayed. Average pixel luminance levels may range from 0% to 100%, with one 100% corresponding to a full white image and 0% corresponding to a full black image.

FIG. 26 shows how tone mapping engine 424 may apply a brightness scaling factor of 1 when average pixel luminance values are low. When a brightness scaling factor of 1 is applied, the peak allowable brightness of display 414 may be equal to the peak brightness of which display 414 is capable (e.g., the maximum achievable brightness of display 414) and/or may be equal to some other default peak brightness level. When average pixel luminance values are high, control circuitry 412 may scale down the maximum allowable brightness of display 414 accordingly. For example, control circuitry 412 may apply a brightness scaling factor between 0 and 1 when average pixel luminance levels are high. When control circuitry 412 applies a brightness scaling factor of 0.8, for example, the maximum allowable brightness of display 414 may be equal to 0.8 multiplied by the maximum brightness of which display 414 is capable and/or a default maximum brightness level. Scaling down the peak brightness of display 414 when display 414 displays mostly white content (e.g., high average pixel luminance) may help reduce power consumption. On the other hand, maintaining a high peak brightness for images that are mostly dark content (e.g., low average pixel luminance) may help maintain good readability in outdoor environments.

Consider, as an example, a display with a maximum achievable brightness of 1,200 nits. When the brightness scaling factor is equal to 1, the maximum allowable brightness of display 414 may be set to 1,200 nits. As such, the brightness of pixels 436 may reach 1,200 nits when displaying the color white (e.g., R=G=B=255). A brightness scaling factor of 1 may, for example, correspond to tone mapping curve 442 of FIG. 24. When the brightness scaling factor is equal to 0.8, the maximum allowable brightness of display 414 may be set to 960 nits. With this brightness setting, the brightness of pixels 436 may only reach 960 nits when displaying the color white (e.g., R=G=B=255). A brightness scaling factor of 0.8 may, for example, correspond to tone mapping curve 438 of FIG. 24.

Figure 27:
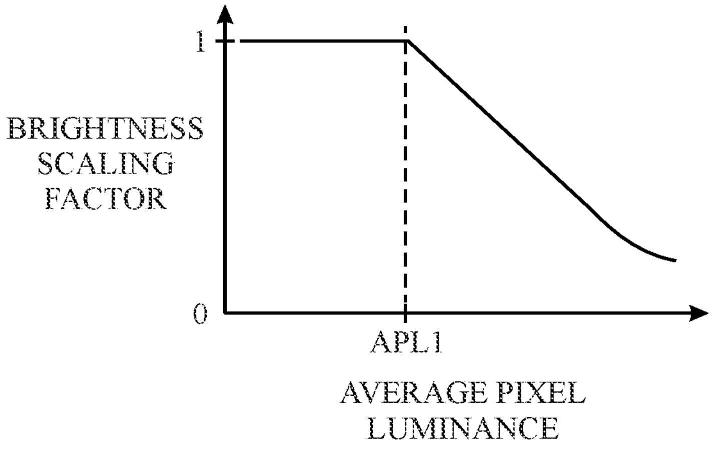
FIG. 27 is a graph showing how a brightness scaling factor may decrease when average pixel luminance levels exceed a threshold, in accordance with an embodiment.

FIG. 27 is a graph showing another illustrative example of how a peak brightness setting may be dynamically adjusted based on average pixel luminance levels. In the example of FIG. 27, control circuitry 412 may only scale down the peak brightness of display 414 for average pixel luminance values that exceed a given threshold. For example, control circuitry 412 may apply a peak brightness scaling factor of 1 for average pixel luminance values between 0 and APL1 (e.g., the peak brightness of display 414 may be equal to the maximum brightness of which display 414 is capable or other default brightness). For average pixel luminance levels greater than APL1, control circuitry 412 may apply a brightness scaling factor between 0 and 1 to thereby scale down the peak brightness of display 414 according to the average pixel luminance level. The curves of FIGS. 26 and 27 are merely illustrative, however. If desired, other curves for mapping average pixel luminance values to a brightness scaling factor may be used.

If desired, engine 424 may apply a content-dependent brightness scaling factor as shown in FIGS. 26 and 27 only in bright ambient light settings and/or when a user has enabled a dark viewing mode (e.g., when display 414 is set by a user to display light text on dark backgrounds). For example, engine 424 may use the mapping curve of FIG. 26 to determine a peak brightness setting for display 414 based on average pixel luminance only when ambient brightness levels exceed a given threshold (e.g., 5,000 nits or other suitable threshold). In other arrangements, engine 424 may determine a peak brightness setting based on average pixel luminance regardless of the ambient light level.

Figure 28:
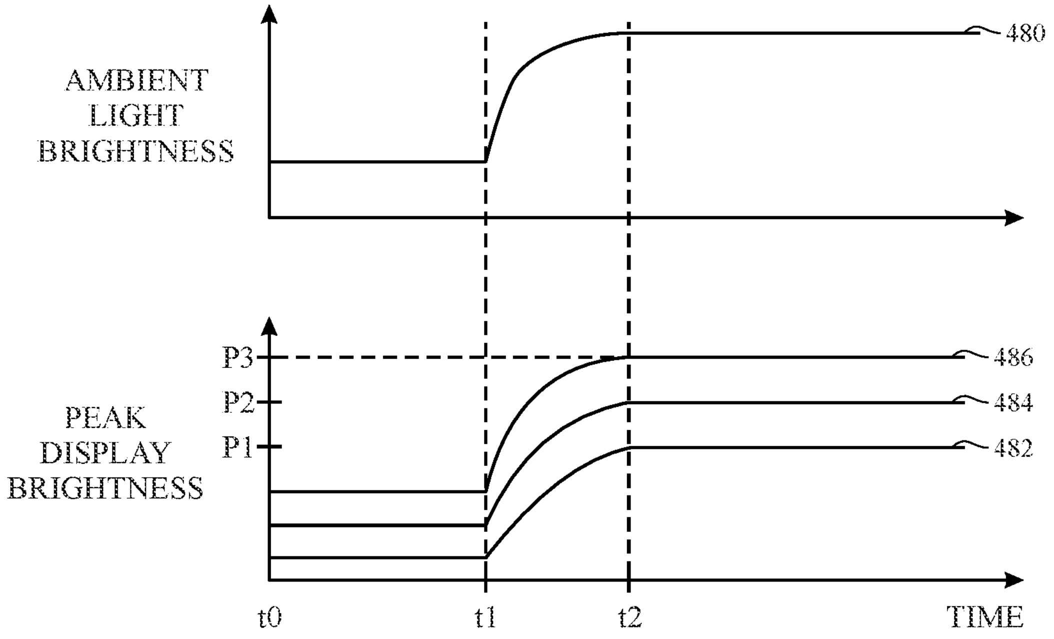
FIG. 28 is a graph showing how a peak display brightness may be adjusted based on ambient light brightness and average pixel luminance levels associated with image content, in accordance with an embodiment.

FIG. 28 is a graph showing how the peak display brightness may be adjusted based on both ambient light and average pixel luminance level. Curve 480 of FIG. 28 is an illustrative example of how ambient light brightness may change over time. Curves 482, 484, and 486 show different ways in which the peak display brightness may be adjusted as ambient light brightness changes over time. Curve 482 shows how peak display brightness may be adjusted when average pixel luminance levels are high, curve 484 shows how peak display brightness may be adjusted when average pixel luminance levels are moderate, and curve 486 shows how peak display brightness may be adjusted when average pixel luminance levels are low.

As shown in FIG. 28, curves 482, 484, and 486 generally track ambient light brightness changes. When ambient light brightness is static between time t0 and time t1, peak display brightness may also remain static. When ambient light brightness increases from time t1 to time t2, the peak display brightness may also increase to improve readability of display 414. When ambient light is static at time t2, the peak brightness of display 414 may also remain static.

From time t2 onward, display 414 may be located in a bright outdoor environment. Thus, to ensure that display 414 maintains good readability, the peak brightness of display 414 may be increased accordingly, as shown by curves 482, 484, and 486. Depending on the content being displayed, display 414 may reach different peak brightness levels in bright outdoor light. For example, the peak allowable brightness in bright ambient light after time t2 may be based on average pixel luminance levels (e.g., as discussed in connection with FIGS. 26 and 27) and/or may be based on other information about the content on display 414 (e.g., which application is displaying content on display 414, whether the content on display 414 is mostly color content, mostly black and white content, mostly dark content, mostly light content, etc.).

When the content on display 414 is mostly dark content (e.g., when average pixel luminance levels are low), display 414 may follow curve 486 and may take advantage of the maximum brightness of which display 414 is capable in outdoor environments without compromising battery life. As shown in FIG. 28, curve 486 reaches peak brightness level P3 at time t2, which may be equal to the peak achievable brightness of display 414 or the default brightness of display 414.

When the content on display 414 is a mix of dark and light content (e.g., when average pixel luminance levels are moderate), display 414 may follow curve 484 and may scale down the maximum brightness of which display 414 is capable in outdoor environments to help extend battery life. As shown in FIG. 28, curve 484 reaches peak brightness level P2 at time t2, which may be less than the maximum brightness of which display 414 is capable and/or less than the default maximum brightness of display 414. For example, peak brightness P2 may be determined by multiplying the maximum achievable brightness of display 414 and/or the default maximum brightness of display 414 by a brightness scaling factor (e.g., a factor between 0 and 1).

When the content on display 414 is mostly light content (e.g., when average pixel luminance levels are high), display 414 may follow curve 482 and may scale down the maximum brightness of which display 414 is capable in outdoor environments to help extend battery life. As shown in FIG. 28, curve 482 reaches peak brightness level P1 at time t2, which may be less than the maximum brightness of which display 414 is capable and/or less than the default maximum brightness of display 414. For example, peak brightness P1 may be determined by multiplying the maximum achievable brightness of display 414 and/or the default maximum brightness of display 414 by a brightness scaling factor (e.g., a factor between 0 and 1).

If desired, the control circuitry may only impose this type of content-dependent peak brightness adjustment when the user has enabled such a feature (e.g., when the user has enabled a dark viewing mode in which images are inverted or partially inverted so that the images are mostly dark content). The user may enable content-dependent peak brightness adjustment and/or a dark viewing mode by adjusting a touch screen display switch (e.g., an on-screen switch displayed on display 414), by providing other touch input and/or force input to display 414, or using a button or other input-output device in circuitry 416.

Figure 29:
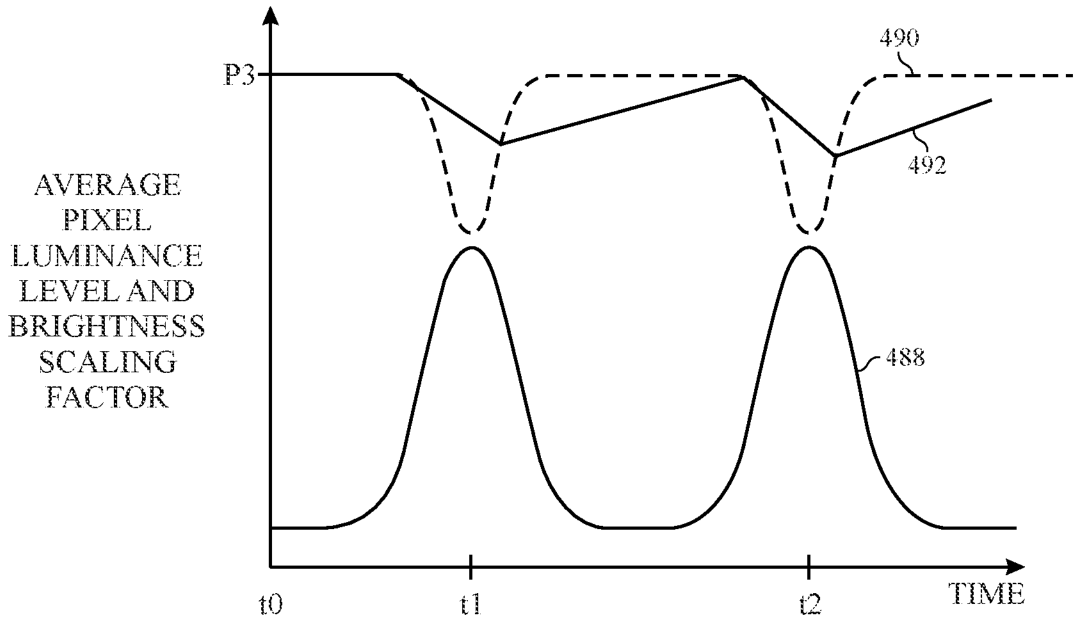
FIG. 29 is a graph showing how a temporal filter may be applied to smooth the transition between peak brightness settings, in accordance with an embodiment.

FIG. 29 is a graph showing how a temporal filter may be applied to smooth the brightness transition as the peak brightness is adjusted based on image content (e.g., based on average pixel luminance levels). The x-axis of FIG. 29 corresponds to time and the y-axis of FIG. 29 corresponds to both average pixel luminance level (measured on a scale of 0 to 1, with 0 being a full black image and 1 being a full white image) and a corresponding brightness scaling factor (also ranging from 0 to 1), which is calculated based on the average pixel luminance level.

Curve 488 of FIG. 29 shows how average pixel luminance may change over time. Curve 490 shows how the brightness scaling factor, which is determined based on average pixel luminance, may change over time. Curve 492 shows how the filtered brightness scaling factor may change over time. As shown in FIG. 29, average pixel luminance levels may reach peaks at times t1 and time t2. To accommodate the increased average pixel luminance levels and times t1 and t2, the brightness scaling factor may decrease at times t1 and time t2 to scale down the maximum allowable brightness of display 414. However, without a temporal filter, the brightness shifts at times t1 and time t2 may be noticeable and unpleasant to the viewer. As shown by curve 492, applying a temporal filter to the brightness scaling factor (e.g., curve 490) may help smooth the transition between peak brightness settings. The filter applied may be a low-pass filter that removes a high-frequency component of the brightness scaling factor. This is, however, merely illustrative. If desired, the raw brightness scaling factor may be applied without applying a temporal filter.

Dual-Control System Based on Slow Control and Fast Control

Keeping the foregoing in mind, it may be desired to combine the slow control systems and methods with the fast control systems and methods to further improve electronic device 10 (or electronic device 410) operation. A content dependent brightness management system, or dual-control system, based on both the slow control systems and methods and the fast control systems and methods may reduce a likelihood that the two control methods fight against each other in an example implementation and may avoid a content modulated flicker for the fast control operations. Slow control operations may be associated with benefits including limiting average power, reducing thermal power consumption, reducing or eliminating display burn-in, slowed aging, or the like. Furthermore, slow control operations may be preferred over fast control operations due to the slow control operations being less likely to cause image artifacts that disturb a user experience with the electronic device 10. Fast control operations may improve electronic device 10 operation by avoiding panel capability violation and may be quick to implement changes in brightness, leading to responsive changes in the display brightness but with the increased risk for image artifacts that may be perceivable to a viewer. By using both slow and fast control systems, an electronic device 10 may take advantage of the benefits of both systems in a seamless manner, without competition between the control operations, and with a reduced likelihood of image artifacts.

Figure 30:
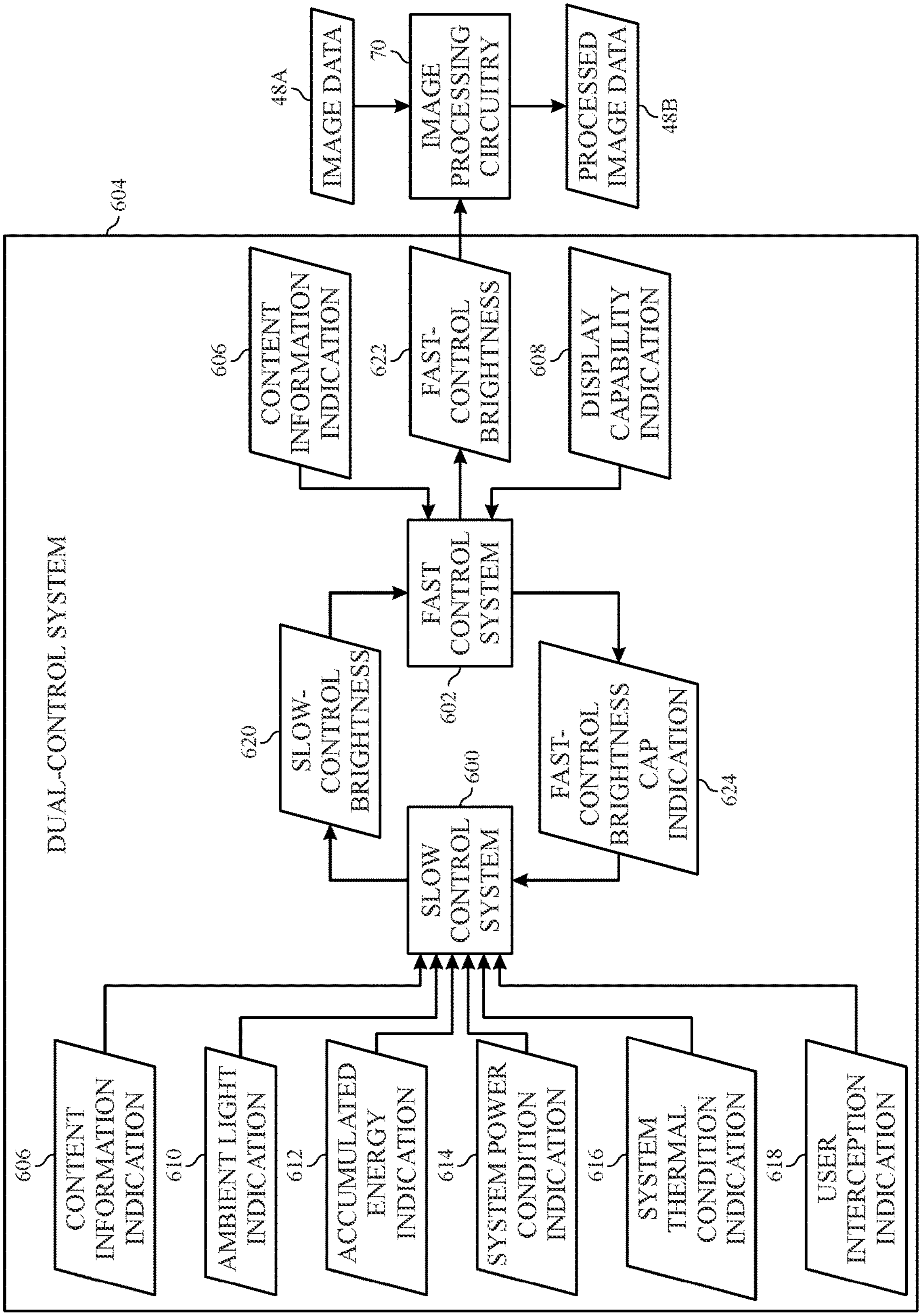
FIG. 30 is a block diagram of an example dual-control system and image processing circuitry, in accordance with an embodiment.

Turning now to FIG. 30, FIG. 30 is a block diagram of an example dual-control system 604 of the electronic device 10 that includes both a slow control system 600 and a fast control system 602. It is noted that the slow control system 600 and/or the fast control system 602 may include any suitable combination of hardware, software, or a combination of the two to perform operations described herein. The slow control system 600 may be operated according to systems and methods described above with reference to FIGS. 23-29, and thus correspond to peak brightness control operations with relatively slower speed (e.g., changes occurring over more than one image frame sometimes lasting up to one or more seconds). The fast control system 602 may be operated according to systems and methods described above with reference to FIGS. 7-22, and thus correspond to peak brightness control operations with relatively faster speeds (e.g., changes occurring after one frame).

In some cases, the slow control system 600 and the fast control system 602 communicate to control a brightness value as part of a dual-control system 604. The slow control system 600 and the fast control system 602 may hand off control of the brightness value between each other. For example, the fast control system 602 may set the brightness value when the fast control system 602 is responding to a change in image data value or a change in system capability but otherwise may let the slow control system 600 control the brightness value. By using this dual-control system 604, electronic device 10 operation may improve by reducing or eliminating image artifacts or other undesirable behavior that might otherwise be perceivable due to changing brightness values.

The fast control system 602 may determine a brightness value based on a content information indication 606 and a display capability indication 608 based on a brightness value received from the slow control system 600. The fast control system 602 may decide which brightness value to send onto the image processing circuitry 70. That is, the fast control system 602 may transmit, as the fast control system 602 selected brightness (fast-control brightness indication 622) either the brightness value determined by the slow control system 600 or the brightness value selected by the fast control system 602. The image processing circuitry 70 may generate scaled image data 48B based on received image data 48A and the brightness value output from the fast control system 602 as the fast-control brightness indication 622.

The slow control system 600 may include the tone mapping engine 424. The slow control system 600 may determine a brightness value based on a content information indication 606 (e.g., content information 462), an ambient light indication 610 associated with ambient conditions 456, an accumulated energy indication 612, a system power condition indication 614 (e.g., power conditions 458), a system thermal condition indication 616 (e.g., thermal conditions 460), a user interception indication 618 (e.g., a tactile or other input to the electronic display 12, user input 466), display characteristics 464, or any combination thereof. In some cases, the slow control system 600 may change a brightness of the electronic display 12 in response to an age of a battery of the electronic device 10. For example, a newer battery may have a relatively higher brightness than an older battery (e.g., 1 month old battery has 2× brightness while a 24 month old battery may have a 1.5× brightness). The brightness may be capped based on the battery age, where brightness value caps are discussed later herein. The slow control system 600 may output the brightness value as a slow-control brightness indication 620 to the fast control system 602. The slow-control brightness indication 620 may be a peak brightness value set by the slow control system 600, and the slow-control brightness indication 620 may be a brightness value indication, a change in brightness value indication, or a content tone map.

The fast-control brightness indication 622 may be a peak brightness value set by the fast control system 602, and the fast-control brightness indication 622 may be a brightness value indication, a change in brightness value indication, or a content tone map. Since the fast control system 602 may select between its own generated brightness value or the slow-control brightness indication 620, the fast control system brightness value 678 may be either a value being originally determined via slow control system 600 operations or a value being originally determined via fast control system 602 operations. The fast control system 602 may transmit a fast-control brightness cap indication 624 to the slow control system 600. The fast-control brightness cap indication 624 may indicate a peak brightness cap (e.g., a maximum brightness value) set by the fast control system 602 that is to be followed by the slow control system 600 unless deemed unreasonable or statistically unrealistic based on historical brightness data (e.g., operations described with regards to FIG. 37).

Figure 31A:
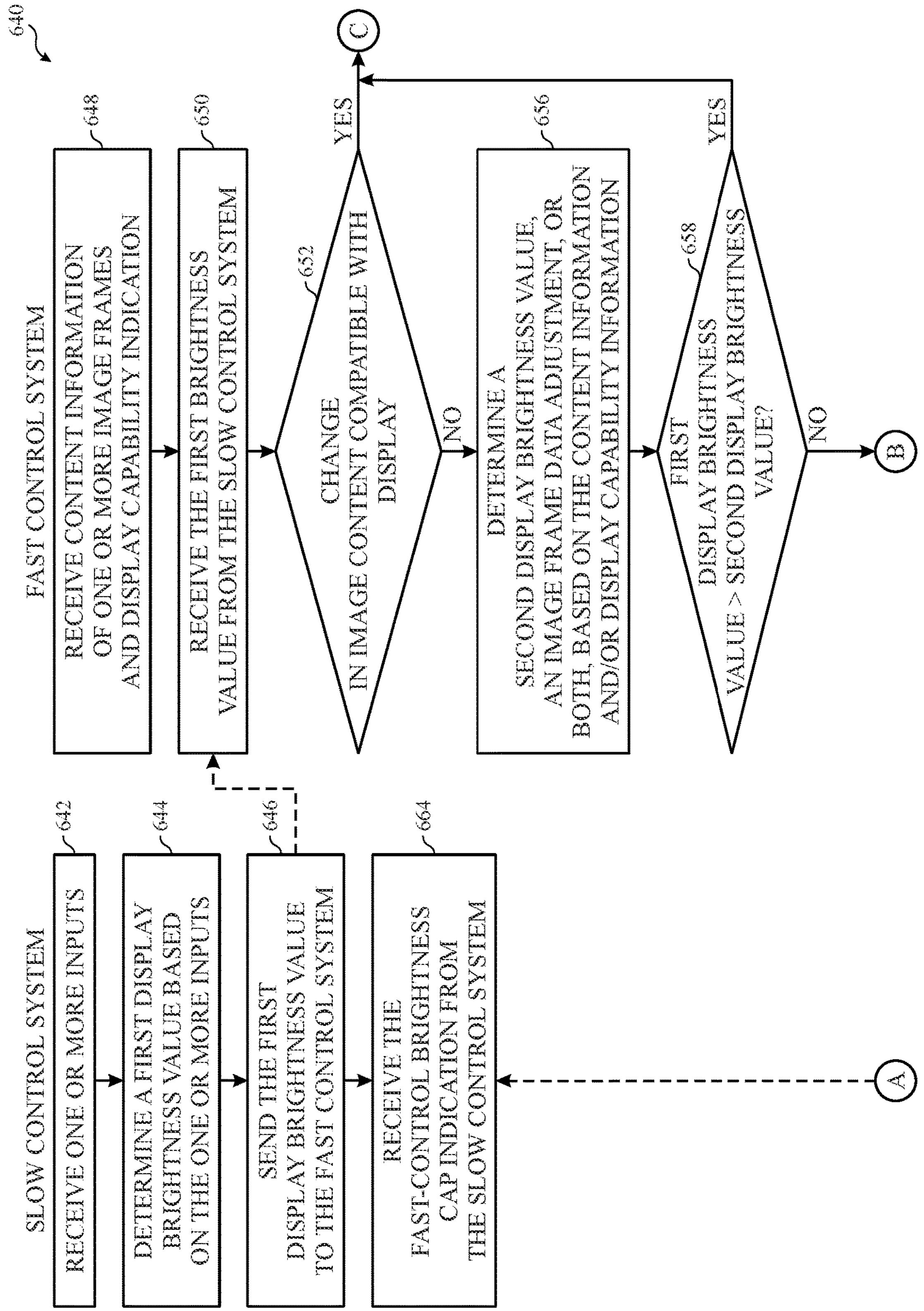
FIGS. 31A and 31B are a flowchart of a method of interactions between the dual-control system of FIG. 30 and image processing circuitry of FIG. 30, in accordance with an embodiment.
Figure 31B:
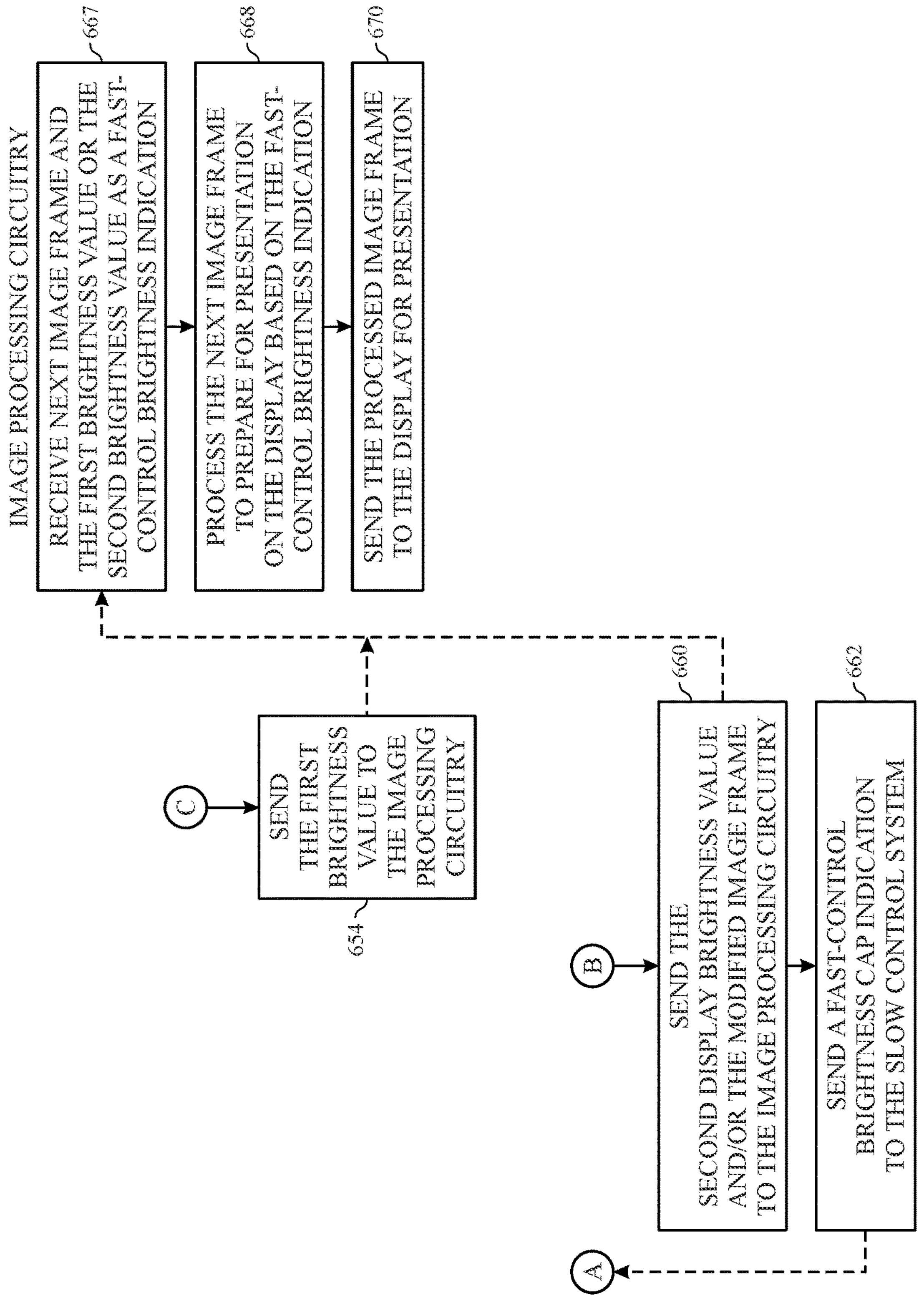

Elaborating on the operations of the dual-control system 604, FIGS. 31A and 31B illustrate a method 640 performed by the different sub-systems corresponding to the dual-control system 604 (e.g., slow control system 600, fast control system 602, and image processing circuitry 70) when determining a brightness value and processing image data of an image frame. The method 640 of the flowchart may be performed by any suitable circuitry (e.g., one or more processing blocks of an application-specific integrated circuit (ASIC)) or instructions (e.g., software or firmware) running on processing circuitry (e.g., the processor core complex). For example, all or some of the method 640 may be performed by the intra-frame luminance scaling 74 and/or the tone mapping engine 424 implemented as instructions running on the processor core complex 18 or as circuitry (e.g., one or more processing blocks of an application-specific integrated circuit (ASIC)), or both, and/or the image processing circuitry 70.

At block 642, the slow control system 600 may receive one or more inputs including the content information indication 606, the ambient light indication 610, the accumulated energy indication 612, the system power condition indication 614, the system thermal condition indication 616, the user interception indication 618, or any combination thereof. The content information indication 606 may correspond to image data for one or more image frames and/or may include other data associated with the image data for one or more image frames. The one or more image frames may include a next future image frame to be presented via the display 12. An image source, such as a portion of the processor core complex 18 that generates image frame data in response to operations of the electronic device 10 and/or inputs received via the electronic device 10, may generate and send the content information indication to the slow control system 600 and the fast control system 602 (e.g., at block 646 described below). The content information indication 606 may include an indication of an average power level of the display 12, an average pixel luminance of the one or more image frames, an average zone luminance corresponding to one or more regions of pixels of the one or more image frames, a weighted combination of any of these values, or the like. The ambient light indication 610 may communicate a value of an ambient light sensed via a sensor. The accumulated energy indication 612 may communicate a cumulative amount of energy present on the display 12 after the previous presentation operations. This may be determined by the processor core complex 18 based on previous indications of image data brightness and an expected amount of current being drawn to produce the desired image frame. The system power condition indication 614 and/or the system thermal condition indication 616 may communicate a system power and thermal specification by which the display brightness value is to be selected to comply. In other words, the selected first display brightness value is to not cause a condition at presentation of the image frame that exceeds settings indicated via the system power condition indication 614 and/or the system thermal condition indication 616. Finally, the user interception indication 618 may be an input received via a graphical user interface (GUI) communicating to the processor core complex 18 a desired brightness setting. The desired brightness setting may be used as an upper limit to a brightness range that the slow control system 600 uses to select the first display brightness value.

At block 644, the slow control system 600 may use any of the one or more inputs to determine a first display brightness value. Processes used by the slow control system 600 to generate the first display brightness value are described below with reference to FIGS. 33-36. Before being consumed by the slow control system 600 and the fast control system 602, the content information indication 606 may be further processed by the processor core complex 18 to determine first display brightness value. For example, the content information indication 606 may be processed using a temporal filter (e.g., FIR, IIR), sub-sampling operation, an up-sampling operation, and/or a combination of these operations. At block 646, the slow control system 600 may send the first display brightness value to the fast control system 602 (e.g., "slow-control brightness" in FIG. 30) as the slow-control brightness indication 620.

At block 648, the fast control system 602 may receive the content information indication 606 from an image source and the display capability indication 608 from, for example, memory 20 or storage devices 22. The content information indication 606 may be or include some of the same content information indication 606 received at block 642 by the slow control system 600. The display capability indication 608 may indicate operational specifications of the electronic display 12, such as maximum current permitted, maximum voltage permitted, maximum power permitted, preferred operational range of current, preferred operational range of voltage, preferred operational range of power, or the like. The operational specifications may be read from the memory 20 and/or storage devices 22.

At block 650, the fast control system 602 may receive the first brightness value from the slow control system 600 via the slow-control brightness indication 620. The fast control system 602 and the slow control system 600 may communicate via direct wired couplings, wireless couplings, or via intermediary devices, such as a buffer memory coupling between the two control systems (e.g., control loops). At block 652, the fast control system 602 may determine whether a content transition between a current image frame and a next image frame is compatible with the display capability indication 608. That is, the fast control system 602 determines whether a change in brightness caused by a change in image data (indicated via the content information indication 606) is expected to cause the electronic display 12 to exceed any of the operational specifications (indicated by the display capability indication 608).

If the fast control system 602 determines that the content transition is compatible with the display capability indication 608, at block 654, the fast control system 602 may transmit the first brightness value received at block 650 as the fast-control brightness indication 622 to the electronic display 12. Since a change from the current image frame to a next image frame is not expected to cause the electronic display 12 to violate operating specifications, no relatively fast change in brightness value is needed to prevent damage to the electronic display 12. Thus, the electronic device 10 may default to using the slow control system 600 brightness indication, which may be a value to implement an overall brightness change over several image frames.

If the fast control system 602 determines that the content transition is not compatible with the display capability indication 608, at block 656, the fast control system 602 may determine a second display brightness value, an image frame data adjustment, or both based on the content information indication 606. The adjustment to the brightness value or the image data may be such that when a change from the current image frame to a next image frame is made, after implementing the adjustment, the electronic display 12 is prevented from violating operating specifications. When, at block 658, the fast control system 602 determines that the first display brightness value is less than the second display brightness value, the fast control system 602 may proceed to block 654 and send the first brightness value to the electronic display 12 as the fast-control brightness indication 622. However, when, at block 658, the fast control system 602 determines that the second display brightness value is less than or equal to the first display brightness value, the fast control system 602 may proceed to block 660 and send the second display brightness value to the electronic display 12 as the fast-control brightness indication 622. Thus, the electronic device 10 may default to using the fast control system 602 brightness indication, which may be implementing a brightness change after one image frame. The operations of block 658 may enable the fast control system 602 (e.g., the fast control loop) to control display brightness when the slow control system 600 (e.g., slow control loop) brightness value is greater and may exceed a display 12 panel capability.

The fast control system 602 may update a maximum brightness value permitted via a fast-control brightness cap indication 624. Thus, at block 662, the fast control system 602 may send an indication of the second display brightness value as the fast-control brightness cap indication 624. At block 664, the slow control system 600 may receive the fast-control brightness cap indication 624. The slow control system 600 may count a number of times that it receives a different fast-control brightness cap indication 624. The slow control system 600 may also base a value of the first display brightness value transmitted as the slow-control brightness indication 620 on the fast-control brightness cap indication 624.

At block 667, the image processing circuitry 70 may receive the next image frame and the fast-control brightness indication 622, which includes either the first brightness value or the second brightness value. The image processing circuitry 70 may then, at block 668, process the next image frame to prepare for presentation via the electronic display 12 based on the fast-control brightness indication 622. At block 670, the image processing circuitry 70 may send the processed image frame to the electronic display 12 for presentation.

Figure 32:
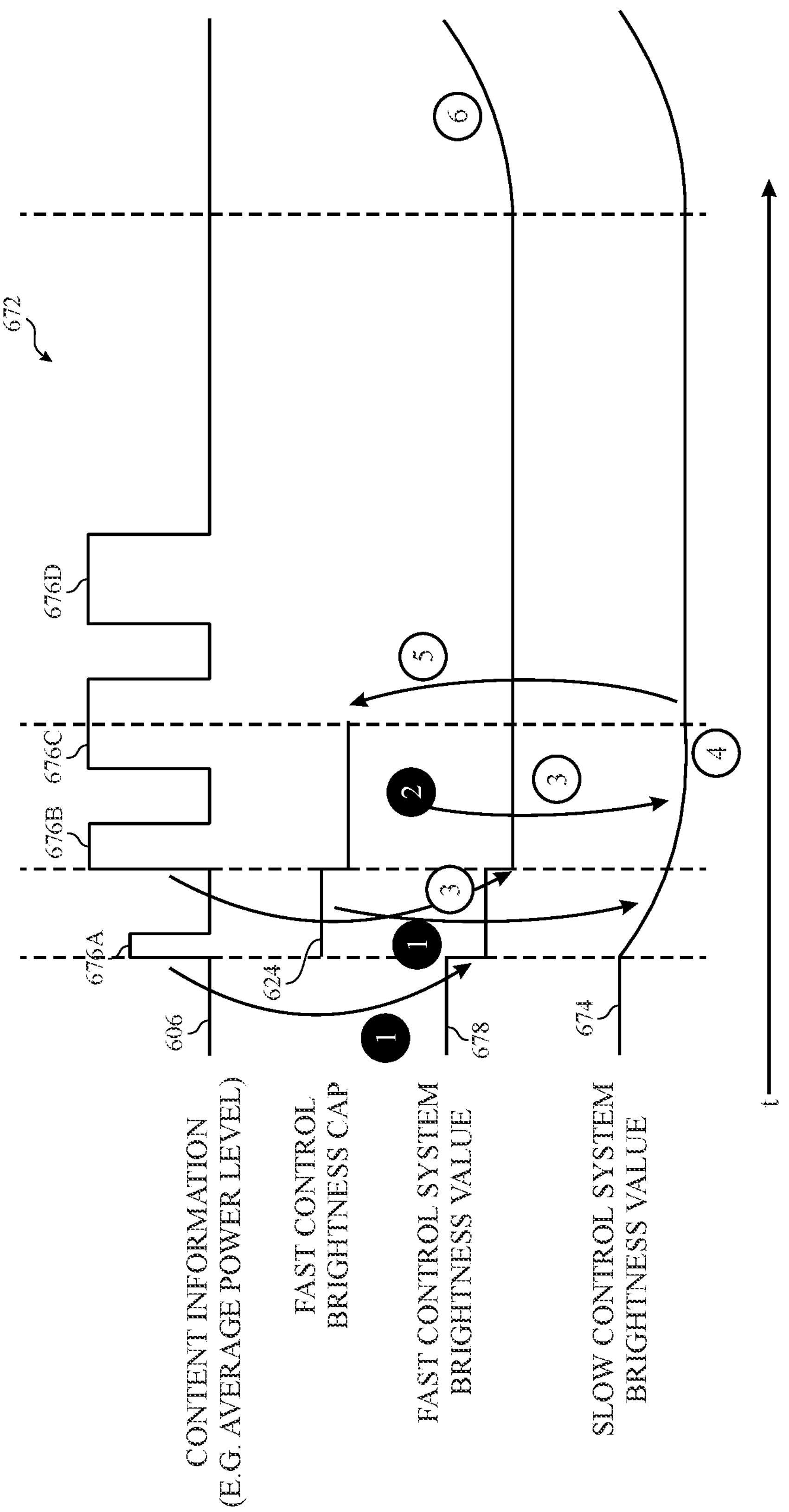
FIG. 32 is a timing diagram that illustrates operations corresponding to the method of FIGS. 31A and 31B, in accordance with an embodiment.

Keeping the foregoing in mind, FIG. 32 is a timing diagram 672 that illustrates the dual-control system 604 operations described by the method 640 of FIGS. 31A and 31B. The timing diagram 672 illustrates, as an example, the content information indication 606, such as a pulse that corresponds to an average power level of a next image frame. The timing diagram 672 illustrates the fast-control brightness cap indication 624, a fast control system brightness value 678 (e.g., second display brightness value generated at block 656 of FIG. 31A), and a slow control system brightness value 674 (e.g., first display brightness value generated at block 644 of FIG. 31A). The fast control system brightness value 678 may be adjusted using stepped decrease in value that aligns with respective pulses 676 (pulse 676A, pulse 676B, pulse 676C, pulse 676D) of the content information indication 606 while the slow control system brightness value 674 may be adjusted gradually as part of an overall exponential decay-type slope that spans several content information indication 606 pulses 676.

Indeed, at operation “1”, the fast control system 602 may update a value of the fast control system brightness value 678 based on the content information indication 606 for two sequential image frames. It is noted that the brightness value could be updated by the fast control system 602 for more than two sequential image frames. Indeed, the fast control system brightness value 678 may be reduced one frame or less than one frame after a content change in image data is indicated via the content information indication 606. The fast control system brightness value 678 may be reduced by a global brightness reduction and/or by a content modification in the image data that reduces a peak brightness presented via the electronic display 12 by way of a tone map.

At operation “2”, the fast control system brightness value 678 may be capped when the slow control system brightness value 674 is greater than the fast control system brightness value 678 to avoid content modulated flicker. Indeed, the fast control system 602 may not increase a brightness value after the content changes to a state within display current, voltage, and/or power capabilities. During operation “2”, the slow control system brightness value 674 may still be dropping, thus the fast control system brightness value 678 and the fast control system 602 may continue to control display 12 brightness.

At operation “3”, the fast control system 602 may send the fast-control brightness cap indication 624 to the slow control system 600, which corresponds to block 662 of FIG. 31B. At operation “4”, the slow control system brightness value 674 may catch up to the fast-control brightness cap indication 624 after the slow control system 600 receives the fast-control brightness cap indication 624. At operation “5”, the fast-control brightness cap indication 624 may be released after the slow control system brightness value 674 catches up to the fast-control brightness cap indication 624. Thus, at operation “5”, the fast control system 602 may pass control of the brightness value to the slow control system 600, which may correspond to block 654 of FIG. 31B. By operation “6”, the slow control system 600 operations take over brightness control after the fast-control brightness cap indication 624 is released. Setting and releasing of the fast-control brightness cap indication 624 may be done based on exchanging of flags between the slow control system 600 and the fast control system 602. In some cases, processing circuitry of the image processing circuitry 70 may determine which of the slow control system brightness value 674 and/or the fast control system brightness value 678 to use.

Figure 33:
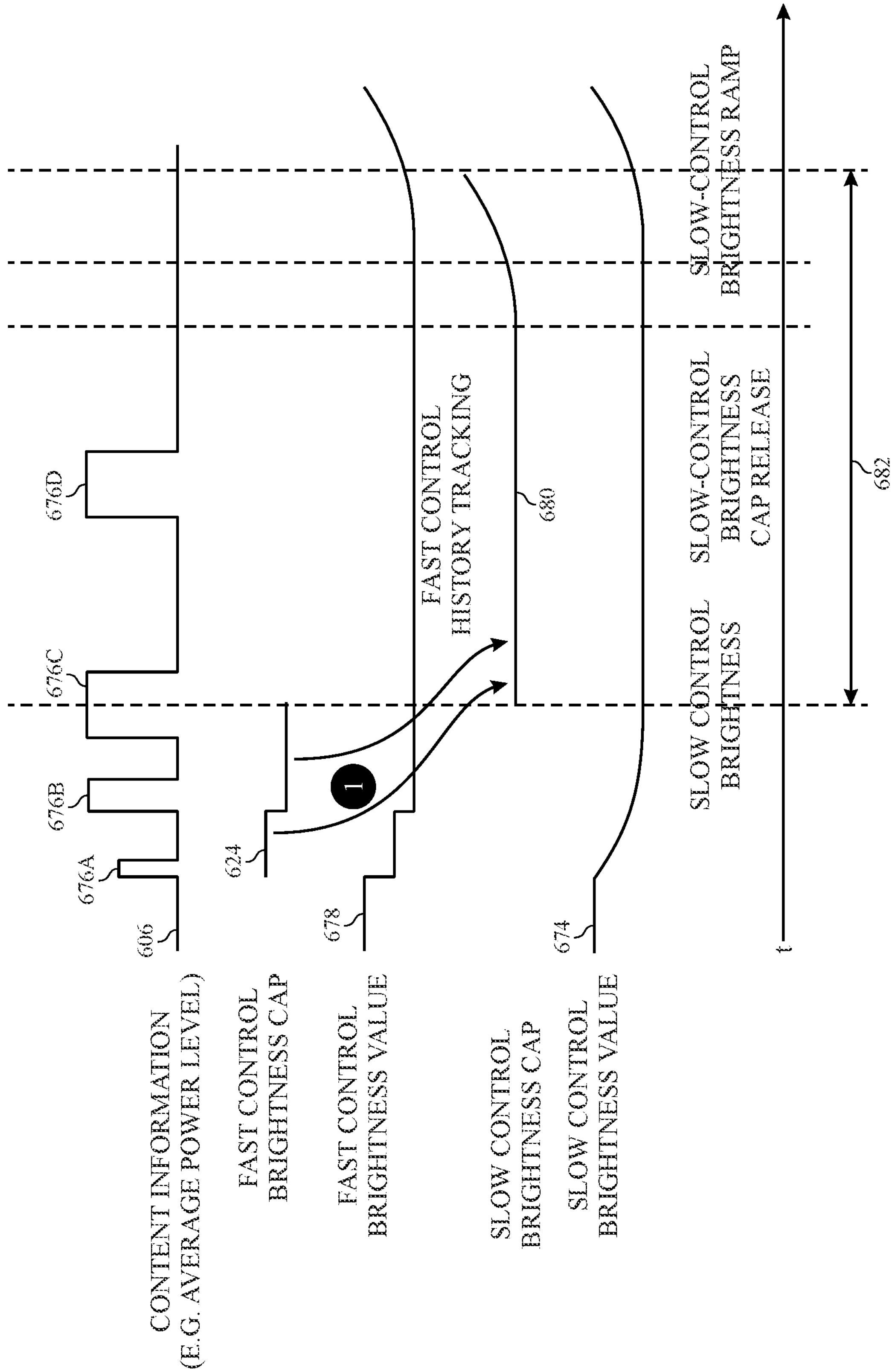
FIG. 33 is a timing diagram illustrating brightness value capping operations of the dual-control system of FIG. 30, in accordance with an embodiment.

During operation, the electronic device 10 may receive several indications to adjust a brightness value of the display 12, which may change a value of the fast-control brightness cap indication 624. An example of this is shown in FIG. 33, which is a timing diagram illustrating how the slow control system 600 may override a fast-control brightness cap indication 624 when the fast-control brightness cap value is changed too often in a threshold amount of time.

The slow control system 600 may receive a fast control activity history indication as one of the inputs. The fast control activity history may indicate historic changes in the value of the fast-control brightness cap indication 624, historic brightness input indications, or the like, which may communicate to the slow control system 600 how frequently the brightness value is being changed by the fast control system 602. The slow control system 600 may determine that the brightness value is being changed too frequently by the fast control system 602 based on a threshold and the fast control activity history. In response to the brightness value and/or the fast-control brightness cap indication 624 being changed too frequently, the slow control system 600 may cap the brightness level. Capping the brightness level generated by the slow control system 600 and/or the fast control system 602 may still enable the fast control system 602 to control the display 12 brightness. The slow control system 600 may, at operation “1”, cap the slow-control brightness value via a slow-control brightness cap indication 680 for a period of time 682 to mitigate future triggering of fast control operations as a proactive approach to display panel protection and preventive mitigation of image artifacts that may occur should the slow control brightness value 674 not be capped. The slow control brightness cap 680 may cause a delay of a ramping up of a slow control brightness value 674 during the time period 682. If in any case, a smaller fast control brightness value 678 is dictated any time when the cap is active, the slow-control brightness cap indication 680 and/or the fast-control brightness cap indication 624 may be aborted so that a final display brightness value follows whatever smaller value is set by the fast control system 602 and/or the slow control system 600. While the slow-control brightness cap indication 680 and/or the fast-control brightness cap indication 624 are set, the electronic display 12 and/or image processing circuitry 70 may refer to the slow-control brightness cap indication 680 and/or the fast-control brightness cap indication 624 and the slow control system 600 and/or the fast control system 602 outputs to set the brightness value used by the image processing circuitry 70 and/or the electronic display 12.

Figure 34:
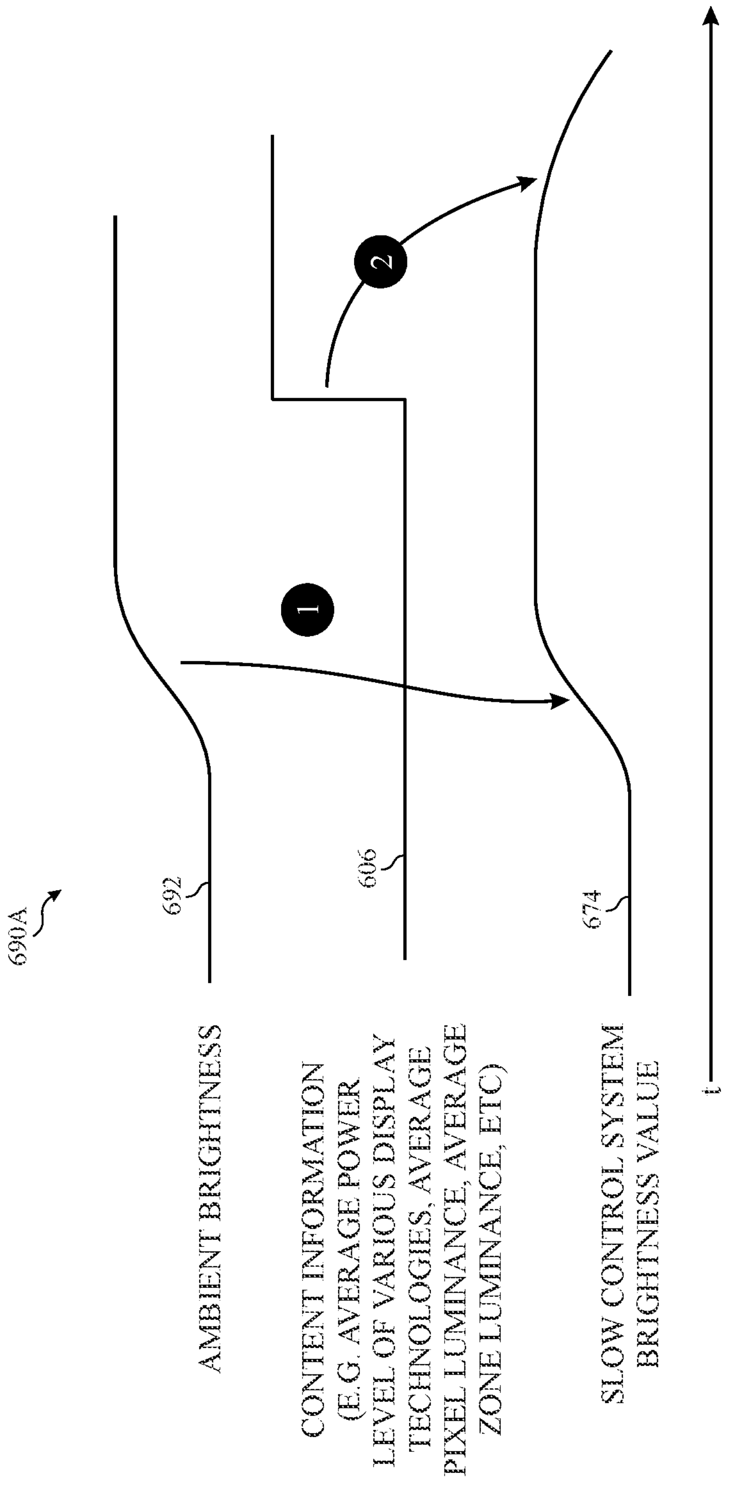
FIG. 34 is a timing diagram illustrating operations of the dual-control system based on an ambient light indication and/or a content information indication, in accordance with an embodiment.
Figure 35:
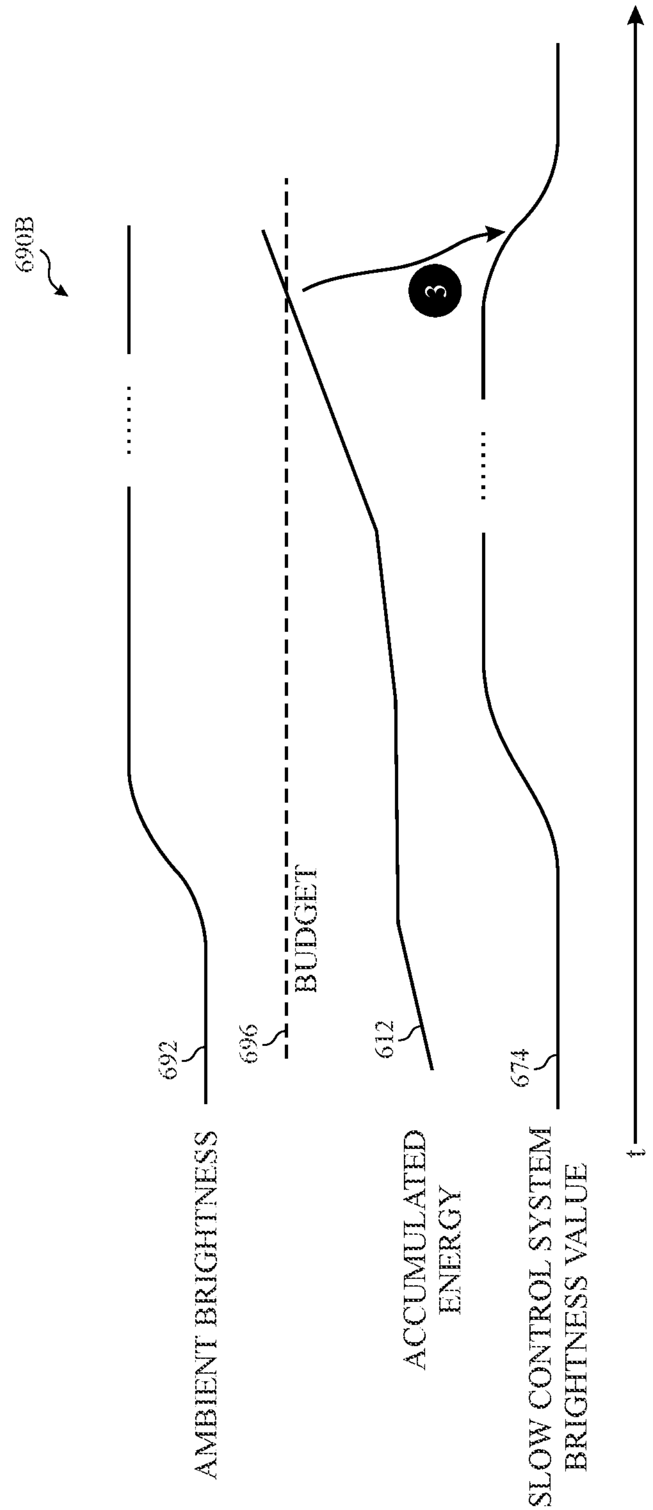
FIG. 35 is a timing diagram illustrating operations of the dual-control system based on an accumulated energy indication, in accordance with an embodiment.
Figure 36:
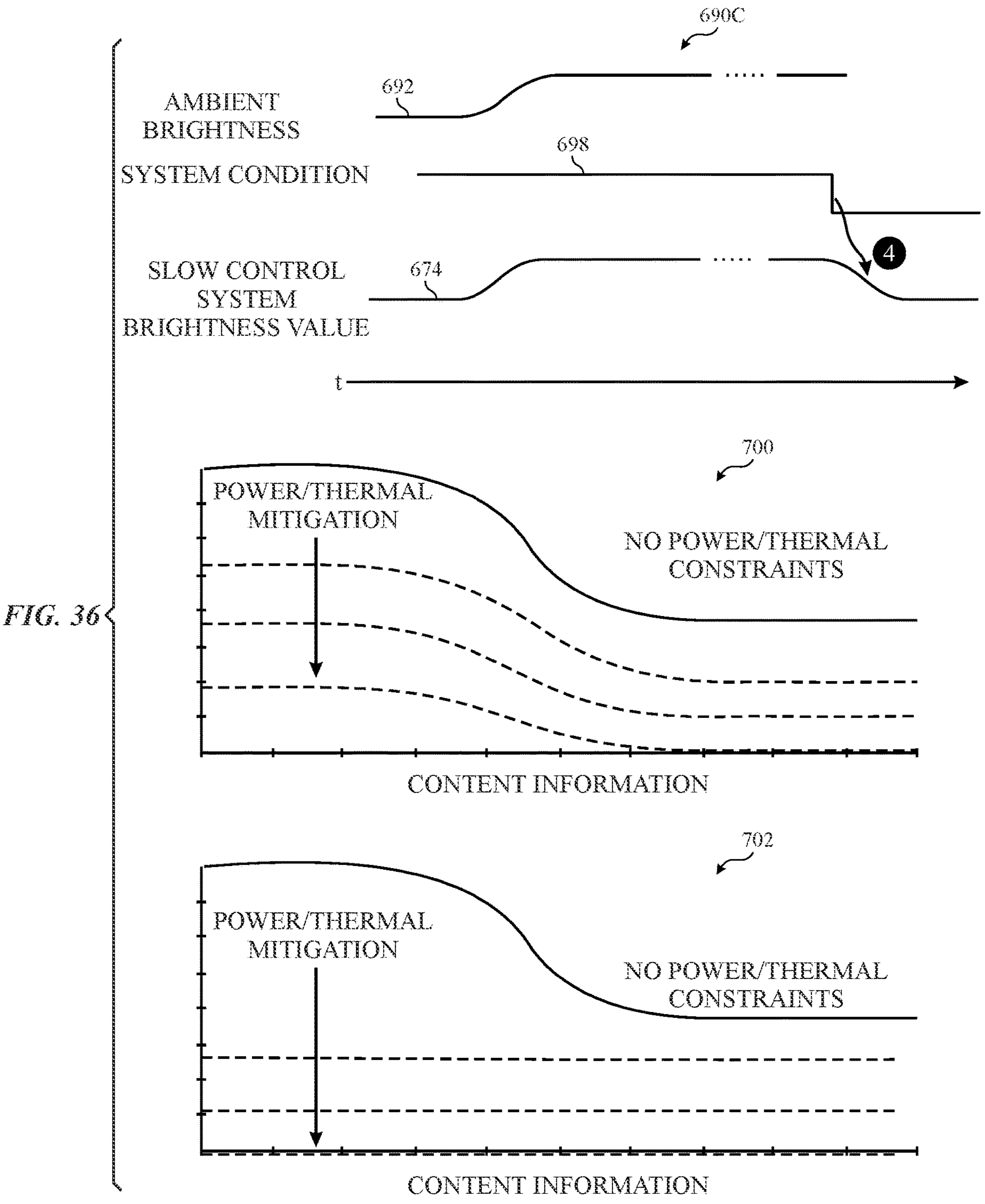
FIG. 36 is a timing diagram illustrating operations of the dual-control system based on a system power indication and/or a system thermal indication, in accordance with an embodiment.
Figure 37:
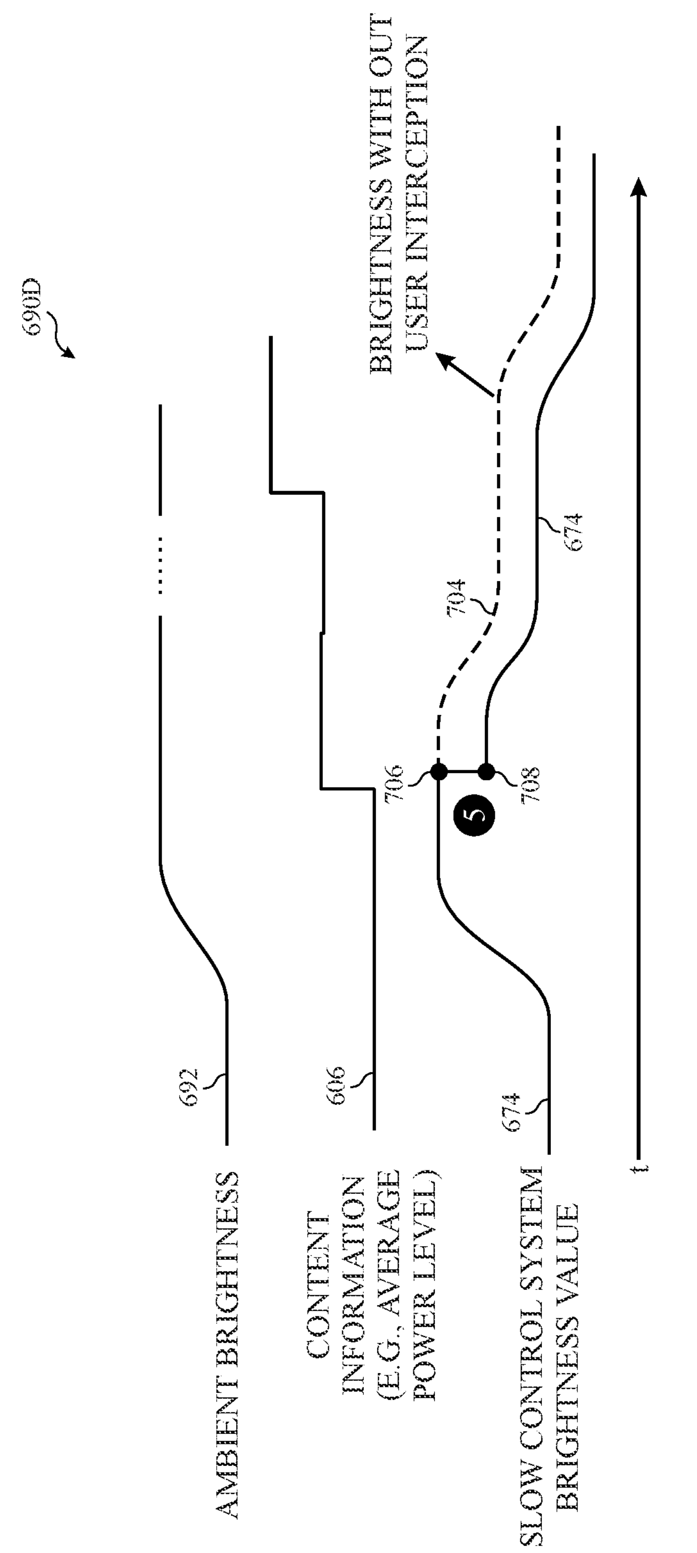
FIG. 37 is a timing diagram illustrating operations of the dual-control system based on a brightness input indication (e.g., a user interception indication) via a graphical user interface (GUI) of the electronic display of FIG. 1, in accordance with an embodiment.

Referring now to block 642 of FIG. 31A, the slow control system 600 may receive various inputs and use the different inputs to generate the first display brightness value transmitted at block 646 to the fast control system 602 as the slow-control brightness indication 620 of FIG. 30. FIGS. 34-37 are respective timing diagrams 690 that each illustrate changes in electronic device 10 control signals made based on the different inputs of block 642. Indeed, FIG. 34 is an example timing diagram illustrating operations of the electronic device 10 when the slow control system 600 receives the ambient light indication 610 and/or the content information indication 606. FIG. 35 is an example timing diagram illustrating operations of the electronic device 10 when the slow control system 600 receives the accumulated energy indication 612. FIG. 36 is an example timing diagram illustrating operations of the electronic device 10 when the slow control system 600 receives the system power condition indication 614 and/or the system thermal condition indication 616. FIG. 37 is an example timing diagram illustrating operations of the electronic device 10 when the slow control system 600 receives the brightness input indication (e.g., user interception indication 618) via a GUI. For ease of discussion, FIGS. 34-37 are generally referred to together herein.

Indeed, in each of FIGS. 34-37, the timing diagrams 690 (timing diagram 690A, timing diagram 690B, timing diagram 690C, timing diagram 690D) each include ambient lux signal 692 indicative of a sensed value of an ambient brightness of the electronic device 10 over time. The timing diagrams 690 also include a representation of a value of the slow-control brightness indication 620 changing over time. Each of the timing diagrams 690 includes an additional signal to the ambient lux signal 692 and the slow-control brightness indication 620 that represents a change in value over time of the brightness value generated by the slow control system 600 at block 644 of FIG. 31A. Furthermore, in each of these timing diagrams, the slow control system brightness value 674 may include an indication of a brightness value, an indication of a tone map, an indication of a change to be applied to an existing value, an indication of a change to be applied to an existing value, or any combination thereof.

For example, the timing diagram 690A of FIG. 34, the slow control system 600 may change a value of the slow-control brightness indication 620 based on a value of the content information indication 606. As the ambient environment of the electronic device 10 increases in brightness, the sensed value of the ambient lux signal 692 may increase (e.g., operation "1"). When the value of the ambient lux signal 692 reaches a threshold value, such as the average power level indicated via the content information indication 606, the content information indication 606 may change in value (e.g., corresponding to operation "2"). The slow control system 600 may change a value of the slow-control brightness indication 620 based on the value of the content information indication 606, resulting in the slow control system 600 reducing a value of the slow-control brightness indication 620 to compensate for the increase indicated by the content information indication 606. A duration of time used by the slow control system 600 to implement the change in display brightness via the slow-control brightness indication 620 may be determined based on a number of factors, including a type and/or bandwidth of a filer used by the slow control system 600, a sampling rate of the slow control system 600, a brightness ramping speed of the slow control system 600, a ramping frame rate of the slow control system 600, or the like. The duration of time may determine a final experience of the viewer regarding how responsive the electronic display 12 is to a requested change in brightness. Thus, the slow control system 600 may determine the duration of time based on determining the shortest amount of time that may be used to change the brightness that also does not cause image artifacts.

Referring now to the timing diagram 690B of FIG. 35, the slow control system 600 may change a value of the slow-control brightness indication 620 based on a value of the accumulated energy indication 612. To save power, the slow control system 600 may reduce the value of the slow-control brightness indication 620 (e.g., operation "3") after the accumulated energy value indicated by the value of the accumulated energy indication 612 hits a threshold value ("budget" 696). Energy accumulation may be a function of display brightness and content information. For example, 1000 nits contributes to faster energy accumulation compared to 500 nits for the same image frame content. To save power, the slow control system 600 may reduce the value of the slow-control brightness indication 620 in response to other situations. The other situations may include the case where a user input disables the visibility boost feature voluntarily (e.g., reduces a brightness of the screen via input to a GUI), the case where a fixed amount of time passes (e.g., a day, a few hours, other suitable time frames), the case where a fixed amount of time passes while in a session, where the session may be defined as a consecutive period of time in a certain use case (e.g., display on, ambient light is above a certain threshold). The slow control system 600 may permit the slow-control brightness indication 620 to recover to an elevated level in response to a cool-off or grace period ended that was avoiding long usage at an elevated brightness level, in response to a hardware toggle (e.g., the electronic display 12 turning on or off, rebooting the electronic device 10), in response to a user input enabling the visibility boost feature, or the like.

In the timing diagram 690C of FIG. 36, the slow control system 600 may change a value of the slow-control brightness indication 620 based on a value of the system power condition indication 614 and/or the system thermal condition indication 616 (e.g., operation "4"). Here, the system power condition indication 614 and the system thermal condition indication 616 are jointly represented via a system condition signal 698. The system power condition indication 614 may indicate a value of a system peak power and the system thermal condition indication 616 may indicate a value of a system thermal budget. The slow control system 600 may aim to select the slow-control brightness indication 620 such that the system peak power, the system thermal budget, or both, are not exceeded. The slow control system 600 may reduce a value of the slow-control brightness indication 620 based on determining to throttle the display 12 brightness. Indeed, the slow control system 600 may throttle the display 12 at least in part by reducing the brightness of the display 12 to a certain level that just meets the current system specifications indicated by the slow control system 600, which may provide presentation improvement over other brightness mitigation methods described herein since this adjustment to the brightness level is relatively fine. The slow control system 600 may throttle the display 12 at least in part by reducing the brightness value below a certain range instead of below a certain value, which may provide an optimized viewer experience by being relatively more conservative in how the throttling is applied. The slow control system 600 may throttle the electronic display 12 at least in part by scaling down the entire mapping relationship between the ambient lux signal 692 and the slow-control brightness indication 620 to trade-off between the brightness of the image content and power consumption, as is generally illustrated via inset plot 700. Moreover, the slow control system 600 may throttle the electronic display 12 at least in part by disabling content dependency, as is generally illustrated via inset plot 702.

In the timing diagram 690D of FIG. 37, the slow control system 600 may change a value of the slow-control brightness indication 620 based on the brightness input indication (e.g., user interception indication 618) via a GUI and the content information indication 606, which may indicate an average power level of the electronic display 12 or other suitable data. The slow control system 600 may determine at block 644 of FIG. 31A to set the slow-control brightness indication 620 to a value corresponding to a dashed line 704. If the electronic device 10 has received an input indicating a user inputted brightness level, or a maximum brightness value, the slow-control brightness indication 620 may be capped to that maximum brightness value. In some systems, a user may opt to adjust a first brightness value 706 to a second brightness value 708. This adjustment is represented via operation "5". The slow control system 600 may log an indication of a ratio indicating a relationship between the first brightness value 706 and the second brightness value 708. The slow control system 600 may then for future determinations of the slow-control brightness indication 620 may scale down the value based on the ratio, as illustrated over time in the timing diagram 690D. The ratio may be written over with a new ratio in the event that the user changes the brightness level again. The ratio may be determined relative to the non-scaled slow-control brightness indication 620 and the scaled brightness value post-adjustment, where the adjustment is received via the GUI (e.g., via a slider button interface). Basing future determinations of the slow-control brightness indication 620 on the ratio may improve implementations of brightness adjustments by proactively incorporating a user preference into the control operations, which may consume fewer resources overall by reducing a number of times a brightness is going to be adjusted after being set by the dual-control system 604.

Although described here as the fast control system 602 determining when to send the brightness value determined by the slow control system 600 and when to send the brightness value determined by the fast control system 602, these operations may be performed by another component of the electronic device 10. For example, the processor core complex 18 or control circuitry of the image processing circuitry 70 may select between the two options for the display brightness value.

The specific embodiments described above have been shown by way of example, and it should be understood that these embodiments may be susceptible to various modifications and alternative forms. Indeed, while the disclosure has referred to scaling the luminance of image data to prevent self-emissive pixels of an electronic display from drawing too much power, this may also be applied to electronic displays with a one- or two-dimensional backlight. In that case, the luminance of backlighting may be accumulated as the backlight changes from row to row or image frame to image frame. The amount of light emitted by the backlight may be scaled as appropriate to keep the electronic display from exceeding the power consumption provided by a power supply. It should be further understood that the claims are not intended to be limited to the particular forms disclosed, but rather to cover all modifications, equivalents, and alternatives falling within the spirit and scope of this disclosure.

Technical effects of the present disclosure may include methods to better control brightness based on image content or other inputs to a display system. A dual-control system is described herein that integrates both slow control operations and fast control operations into a cohesive brightness management system. By using both shorter-term (e.g., fast control) and longer-term (e.g., slow control) brightness adjustment operations, the electronic device may quickly respond to high luminance and high brightness situations that may cause burn-in into the display, image artifacts, or other damage. Responding quickly to these high consumption situations may prevent damage or perceivable upset to an ongoing process. Once the situation is initially mitigated using fast control operations, the slow control operations may take over control of the brightness level and provide a relatively smooth transition between brighter and darker screen adjustments based on inputs to a slow control system. Using slow control operations to change the brightness level over the course of multiple image frames may reduce a likelihood of a viewer perceiving image artifacts associated with the change in brightness level.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A tangible, non-transitory, computer-readable medium comprising instructions that, when executed by a processor, cause an electronic device to perform operations comprising:

receiving an accumulated energy indication comprising a value of an amount of energy accumulated in circuitry of an electronic display of the electronic device over time;

determining, via a first control system, a brightness indication based on the accumulated energy indication;

determining, via a second control system, that the brightness indication is compatible with a specification of the electronic display; and sending, via the second control system, the brightness indication to image processing circuitry based on the brightness indication being compatible with the specification, wherein the image processing circuitry is configured to apply an adjustment based on the brightness indication to image data over at least two sequential image frames before sending for presentation.

2. The computer-readable medium of claim 1, wherein the operations comprise:

receiving the accumulated energy indication over the course of multiple image frames.

3. The computer-readable medium of claim 1, wherein the operations comprise:

receiving an indication that a time period has ended, that a hardware component has had a power state changed, that a power state of the electronic display has changed, that an input was received, or a combination thereof; and sending an additional brightness indication comprising an additional brightness level to the image processing circuitry based on the indication to reverse a brightness adjustment implemented based on the brightness indication.

4. The computer-readable medium of claim 1, wherein the operations comprise:

receiving an image content indication and a display capability indication; and determining a change in image content based on the image content indication and a previous image content indication.

5. The computer-readable medium of claim 4, wherein the operations comprise:

determining that the change in image content is compatible with the display capability indication; and sending the brightness indication based on the change in image content.

6. The computer-readable medium of claim 5, wherein the operations comprise:

determining that the change in image content is incompatible with the display capability indication;

determining a brightness value based on the image content indication and the display capability indication in response to determining that the change in image content is incompatible with the display capability indication; and sending the brightness value as the brightness indication to the image processing circuitry.

7. The computer-readable medium of claim 1, wherein the brightness indication comprises a value selected from a plurality of brightness values determined based on different inputs.

8. The computer-readable medium of claim 1, wherein the operations comprise:

receiving an indication that a session has ended, wherein the session corresponds to a consecutive period of time in a certain use case, wherein the certain use case corresponds to the electronic display being powered on, a sensed data meets a condition, or both; and determining the brightness indication in response to receiving the indication.

9. The computer-readable medium of claim 1, wherein the operations comprise:

determining that the amount of energy accumulated exceeds a threshold; and determining the brightness indication based on the accumulated energy indication in response to determining that the amount of energy accumulated exceeds the threshold.

10. The computer-readable medium of claim 1, wherein determining the brightness indication is based on the accumulated energy indication and one or more inputs comprising a system power condition indication, a system thermal condition indication, or both.

11. A system comprising:

image processing circuitry configured to provide image data;

an electronic display configured to display the image data; and a dual-control system configured to monitor an instantaneous average pixel luminance of the electronic display and perform luminance scaling based on one or more inputs to prevent the electronic display from exceeding a power threshold while displaying a current frame of the image data on the electronic display, wherein the luminance scaling is performed at least in part by implementing a first brightness adjustment over one or more image frames corresponding to the image data, wherein the dual-control system comprises:

a first control system configured to generate a first brightness value; and a second control system configured to:

generate a second brightness value; and determine which of the first brightness value and the second brightness value to transmit to the image processing circuitry in association with the first brightness adjustment.

12. The system of claim 11, wherein the dual-control system is configured to:

receive the one or more inputs;

determine a second brightness adjustment based on the one or more inputs;

determine that the second brightness adjustment is compatible with a specification of the electronic display; and transmit an indication of the first brightness adjustment to the image processing circuitry, wherein the image processing circuitry is configured to process the image data to implement the first brightness adjustment.

13. The system of claim 12, wherein the second brightness adjustment implements the first brightness adjustment over at least two sequential image frames.

14. The system of claim 11, wherein the second control system is configured to determine which of the first brightness value and the second brightness value to transmit to the image processing circuitry at least in part by:

determining whether the first brightness value is less than the second brightness value;

in response to the first brightness value being less than or equal to the second brightness value, transmitting the first brightness value to the image processing circuitry; and in response to the second brightness value being less than the first brightness value, transmitting the second brightness value to the image processing circuitry.

15. The system of claim 11, wherein the first control system is configured to generate the first brightness value at least in part by:

determining the first brightness value based on the one or more inputs, wherein the one or more inputs comprise:

a content information indication of at least the current frame, an ambient light indication, an accumulated energy indication, a system power condition indication, a system thermal condition indication, a brightness input indication, or any combination thereof; and transmitting the first brightness value to the second control system.

16. The system of claim 15, wherein the second control system is configured to generate the second brightness value at least in part by:

receiving the content information indication, wherein the content information indication comprises an indication of a change in data from a previous image frame to the current frame;

receiving a display capability indication;

receiving the first brightness value;

determining that the change in data is incompatible with the display capability indication; and determining the second brightness value based on the content information indication and the display capability indication.

17. A method comprising:

receiving an indication of content of a first image frame;

determining a first brightness value based on the indication of content of the first image frame;

determining a second brightness value based on a change in content between the first image frame and a second image frame and a power specification of an electronic display;

transmitting the second brightness value to image processing circuitry as opposed to the first brightness value;

determining a maximum brightness threshold after transmitting the second brightness value to the image processing circuitry;

receiving an indication of content of the second image frame; and determining a third brightness value based on the indication of content of the second image frame and the maximum brightness threshold.

18. The method of claim 17, wherein transmitting the second brightness value to the image processing circuitry as opposed to the first brightness value comprises:

determining that the change in content between the first image frame and the second image frame is expected to result in a charge accumulation on the electronic display that does not satisfy the power specification; and determining that the second brightness value is less than or equal to the first brightness value.

19. The method of claim 17, wherein determining the first brightness value is based on the change in content and one or more inputs comprising:

an ambient light indication, an accumulated energy indication, a system power condition indication, a system thermal condition indication, a brightness input indication, or any combination thereof.

20. The method of claim 17, wherein determining the first brightness value is based on the content of the first image frame and one or more inputs comprising an ambient light indication and an accumulated energy indication.

* * * * *